(12) United States Patent
Lee et al.

(10) Patent No.: US 11,137,928 B2
(45) Date of Patent: Oct. 5, 2021

(54) PREEMPTIVELY BREAKING INCREMENTAL SNAPSHOT CHAINS

(71) Applicant: RUBRIK, INC., Palo Alto, CA (US)

(72) Inventors: Looi Chow Lee, Mountain View, CA (US); Karthikeyan Srinivasan, Fremont, CA (US); Andrew Park, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 58 days.

(21) Appl. No.: 16/261,111

(22) Filed: Jan. 29, 2019

(65) Prior Publication Data

US 2020/0241756 A1 Jul. 30, 2020

(51) Int. Cl.
*G06F 3/06* (2006.01)

(52) U.S. Cl.
CPC .............. *G06F 3/065* (2013.01); *G06F 3/064* (2013.01); *G06F 3/0611* (2013.01); *G06F 3/0619* (2013.01); *G06F 3/0673* (2013.01)

(58) Field of Classification Search
CPC ...... G06F 3/0611; G06F 3/0619; G06F 3/064; G06F 3/065; G06F 3/0673
See application file for complete search history.

(56) References Cited

U.S. PATENT DOCUMENTS

| | | | | |
|---|---|---|---|---|
| 8,332,354 B1* | 12/2012 | Chatterjee | ........... | G06F 11/1461 707/624 |
| 9,811,261 B1* | 11/2017 | Ramani | ................ | G06F 3/0673 |
| 10,901,648 B2* | 1/2021 | Mainali | ............... | G06F 16/2282 |
| 2006/0075007 A1* | 4/2006 | Anderson | ............. | G06F 3/0652 |
| 2014/0149695 A1* | 5/2014 | Zaslavsky | ............... | G06F 12/16 711/162 |
| 2015/0378636 A1* | 12/2015 | Yadav | .................... | G06F 3/0689 711/165 |
| 2016/0124665 A1* | 5/2016 | Jain | ........................ | G06F 3/0685 711/162 |
| 2016/0125059 A1* | 5/2016 | Jain | ..................... | H04L 61/2007 707/639 |

* cited by examiner

*Primary Examiner* — Yaima Rigol
(74) *Attorney, Agent, or Firm* — Schwegman Lundberg & Woessner, P.A.

(57) ABSTRACT

Methods and systems for backing up and restoring different point in time versions of a virtual machine, a real machine, an application, a database, or a set of electronic files using a plurality of independently managed snapshot chains are described. The different point in time versions of the data being backed-up may be stored using two or more snapshot chains corresponding with two or more data partitions of the data being backed-up. Over time, additional full image snapshots may be acquired from an external server or generated locally by a storage appliance to limit the snapshot chain lengths and to limit the aggregate block chain lengths for the snapshot chains. Acquisition and generation of the additional full image snapshots may be staggered across different data partitions to limit computational and storage costs per snapshot.

20 Claims, 27 Drawing Sheets

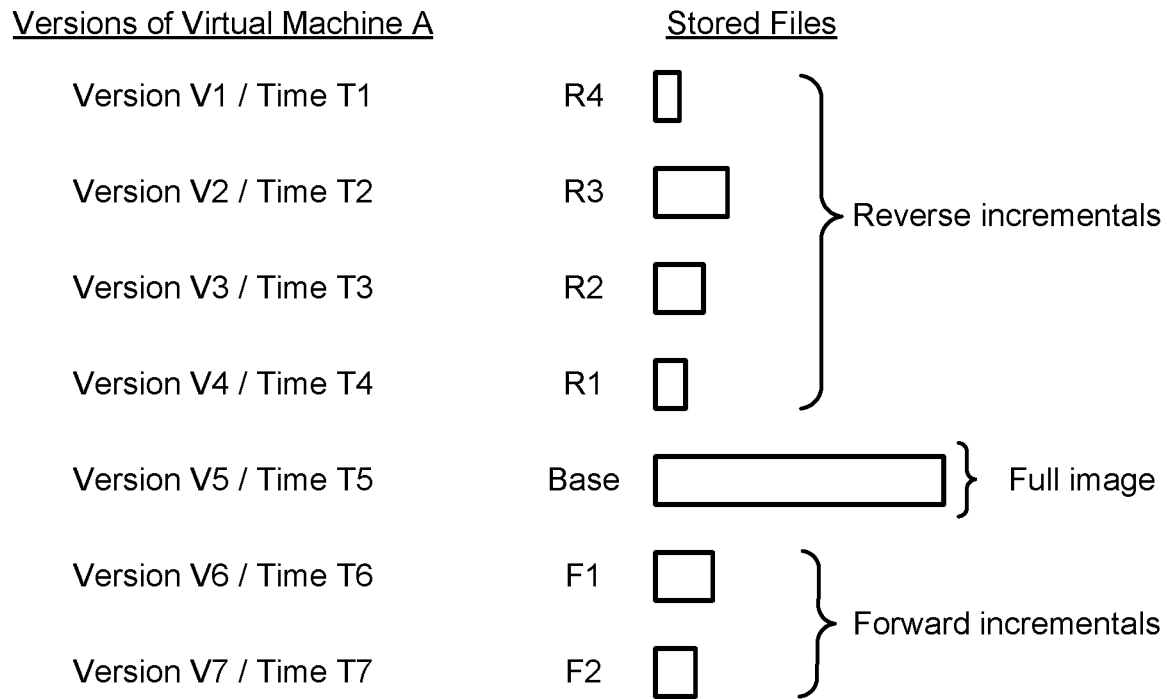

| Versions of Virtual Machine A | Stored Files | |
|---|---|---|
| Version V1 / Time T1 | R4 | ⎫ |
| Version V2 / Time T2 | R3 | ⎬ Reverse incrementals |
| Version V3 / Time T3 | R2 | |
| Version V4 / Time T4 | R1 | ⎭ |
| Version V5 / Time T5 | Base | } Full image |
| Version V6 / Time T6 | F1 | ⎫ Forward incrementals |
| Version V7 / Time T7 | F2 | ⎭ |

FIG. 2A

Virtual Machine A, Version V7 {
    pBase,    ⟶ /snapshots/VM_A/s5/s5.full
    pF1,      ⟶ /snapshots/VM_A/s6/s6.delta
    pF2      ⟶ /snapshots/VM_A/s7/s7.delta
}

FIG. 2B

Virtual Machine A, Version V2 {
    pBase,    ⟶ /snapshots/VM_A/s5/s5.full
    pR1,      ⟶ /snapshots/VM_A/s4/s4.delta
    pR2,      ⟶ /snapshots/VM_A/s3/s3.delta
    pR3      ⟶ /snapshots/VM_A/s2/s2.delta
}

FIG. 2C

```
Virtual Machine A, Version V7 {
    pBase2,              ⟶  /snapshots/VM_A/s7/s7.full
}
```

```
Virtual Machine A, Version V2 {
    pBase2,              ⟶  /snapshots/VM_A/s7/s7.full
    pR11,                ⟶  /snapshots/VM_A/s6/s6.delta
    pR12,                ⟶  /snapshots/VM_A/s5/s5.delta
    pR1,                 ⟶  /snapshots/VM_A/s4/s4.delta
    pR2,                 ⟶  /snapshots/VM_A/s3/s3.delta
    pR3                  ⟶  /snapshots/VM_A/s2/s2.delta
}
```

```
Virtual Machine A, Version VS {
    pBaseA,
    pR4,
}
```

```
Virtual Machine A, Version VU {
    pBaseB,
    pR1,
    pR2,
    pR3
}
```

```
Virtual Machine A, Version VU {
    pBaseA,
    pF9
}
```

| Versions | Snapshot Chain | First Sub-Chain | Second Sub-Chain |
|---|---|---|---|
| Version V1 | R4 | RA4 | RB4 |
| Version V2 | R3 | RA3 | RB3 |
| Version V3 | R2 | RA2 | RB2 |
| Version V4 | R1 | RA1 | RB1 |
| Version V5 | Base ⌠402 → | BaseA ⌠404 | BaseB ⌠406 |
| Version V6 | F1 | FA1 | FB1 |
| Version V7 | F2 | FA2 | FB2 |
FIG. 4A
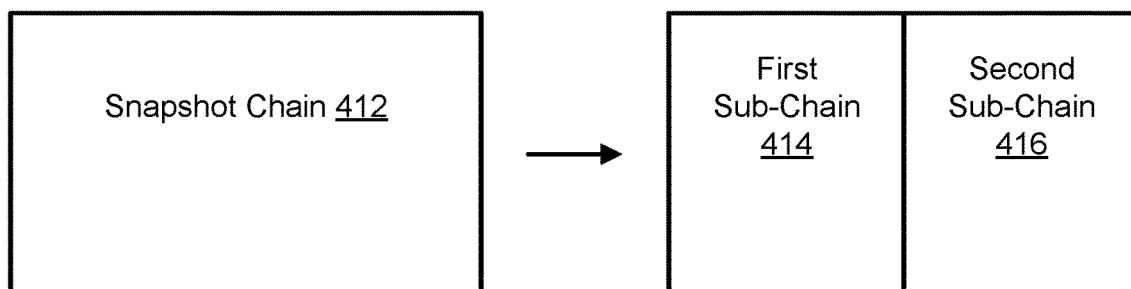
FIG. 4B
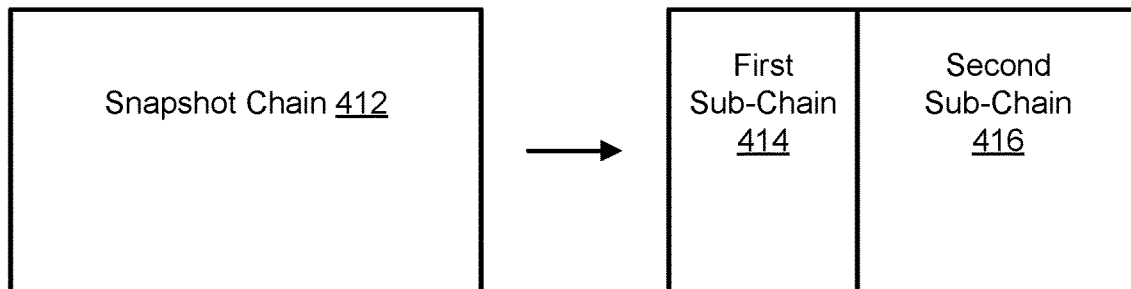
FIG. 4C

| Versions | Snapshot Chain | First Sub-Chain | Second Sub-Chain |
|---|---|---|---|
| Version V1 | R4 | RA4 | RB4 |
| Version V2 | R3 | RA3 | RB3 |
| Version V3 | R2 | RA2 ⌠443 | RB2 |
| Version V4 | R1 | RA1 ⌠442 | RB1 |
| Version V5 | Base ⌠402 → | BaseA ⌠404 | RB12 ⌠438 |
| Version V6 | F1 | FA1 | RB11 ⌠437 |
| Version V7 | F2 | FA2 | 436 ⌡ BaseB2 |

FIG. 4I

| Versions | Chain for First Partition | Chain for Second Partition | Chain for Third Partition | Chain for Fourth Partition |
|---|---|---|---|---|
| Version V3 | RA2 ⌠443 | RB3 | RC4 | RD5 |
| Version V4 | RA1 ⌠442 | RB2 | RC3 | RD4 |
| Version V5 | BaseA ⌠404 | RB1 | RC2 | RD3 |
| Version V6 | FA1 | BaseB ⌠473 | RC1 | RD2 |
| Version V7 | FA2 | FB1 | BaseC ⌠474 | RD1 |
| Version V8 | FA3 | FB2 | FC1 | BaseD ⌠475 |

FIG. 4J

Aggregate block chain length at time T6 = 8 blocks
Snapshot chain length at time T6 = 5 incrementals
Maximum block chain length at time T6 = 3 blocks

PREEMPTIVELY BREAKING INCREMENTAL SNAPSHOT CHAINS

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 2 TB virtual disk) for the virtual machine.

BRIEF DESCRIPTION OF THE DRAWINGS

FIGS. 2A-2K depict various embodiments of sets of files and data structures associated with managing and storing snapshots of virtual machines.

FIG. 4A depicts one embodiment of sets of electronic files for capturing different point in time versions of protected data.

FIG. 4B depicts one embodiment of a snapshot chain being split into two snapshot sub-chains.

FIG. 4C depicts another embodiment of a snapshot chain being split into two snapshot sub-chains.

FIG. 4I depicts one embodiment of the two snapshot sub-chains of FIG. 4A in which snapshot sub-chain operations have been independently performed on the two snapshot sub-chains.

FIG. 4J depicts one embodiment of four snapshot chains that correspond with four data partitions comprising a set of electronic files to be backed-up.

DETAILED DESCRIPTION

Figure 1A:
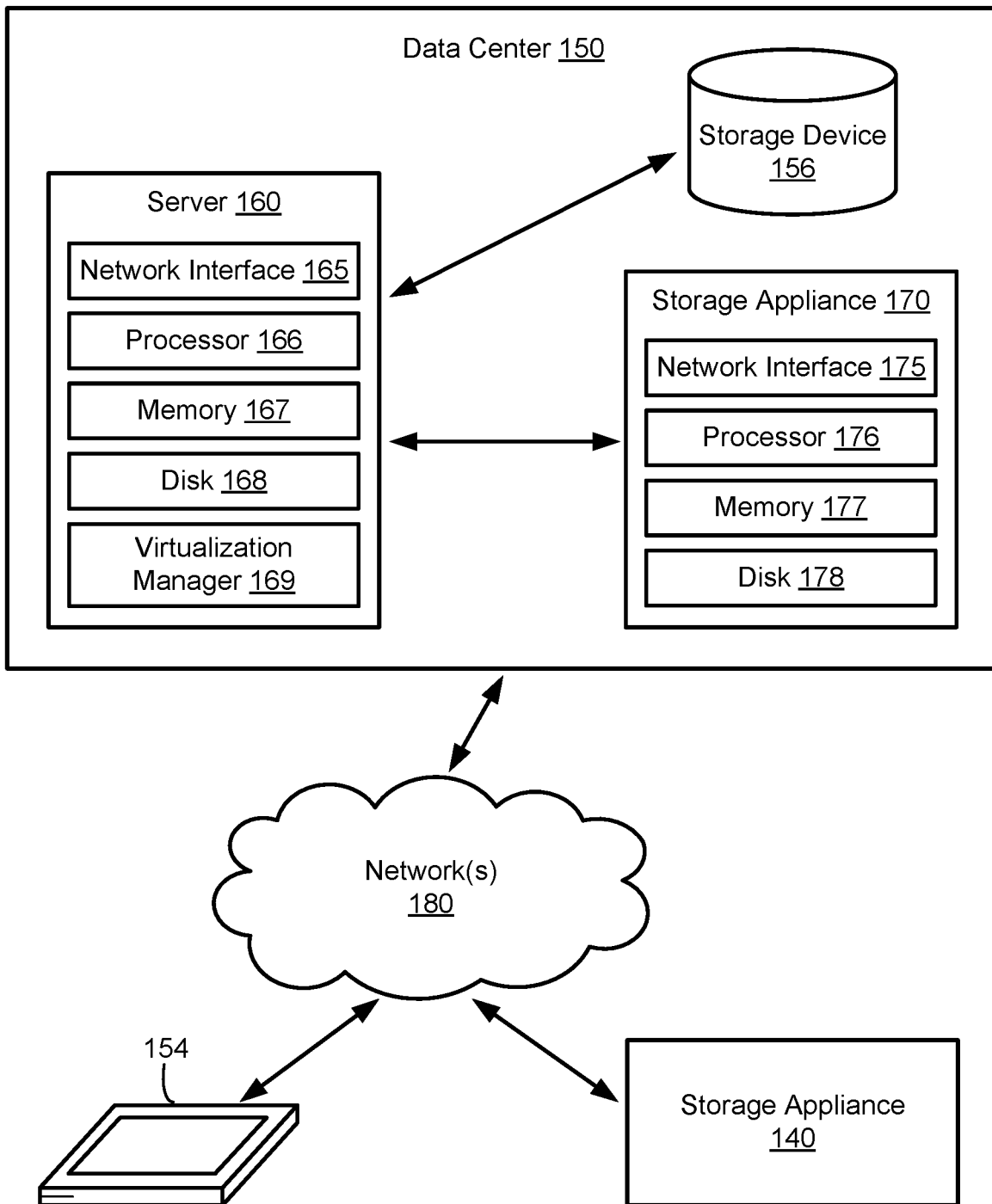
FIG. 1A depicts one embodiment of a networked computing environment.

Technology is described for backing up and restoring different point in time versions of a virtual machine, a real machine, an application, a database, or a set of electronic files using a plurality of independently managed snapshot chains. In some cases, the entire data set being backed-up (e.g., a set of electronic files) may be partitioned into two or more data partitions such that each partition is less than a threshold data size (e.g., each data partition is less than 10 TBs of data). The different point in time versions of the data set being backed-up may be captured on a periodic basis (e.g., every four hours) and stored using two or more snapshot chains corresponding with the two or more data partitions of the data set being backed-up. Each of the snapshot chains may include a full image snapshot (or a base image) and one or more incremental snapshots (e.g., a forward incremental snapshot) that derive from the full image snapshot. Each incremental snapshot may comprise data changes relative to the full image snapshot. The data changes may be represented using one or more changed data blocks.

In some cases, a set of electronic files (e.g., a fileset) may be partitioned logically into a plurality of independent partitions and each partition may correspond with a separate snapshot chain. As the time to restore a particular point in time version of the set of electronic files may increase with the snapshot chain lengths for the snapshot chains (e.g., linearly increasing with the number of forward incremental snapshots per snapshot chain), additional full image snapshots may be acquired (e.g., from a server storing the set of electronic files) or generated (e.g., by a storage appliance backing up the set of electronic files) over time to limit the total number of incremental snapshots within the snapshot chains that need to be applied to generate the particular point in time version of the set of electronic files. The snapshot chain length of a snapshot chain may comprise the maximum number of incremental snapshots that derive from a single full image snapshot for the snapshot chain. Acquisition and/or generation of the additional full image snapshots may be staggered across the different data partitions to limit the computational and storage costs per snapshot and to limit the snapshot chain lengths per snapshot chain.

One technical issue with using snapshot chains with full image snapshots that comprise large file sizes (e.g., larger than 50 TB) is that performance of some data storage operations, such as a consolidation operation or a rebasing operation, may be time consuming or may not be possible if the amount of available disk space is less than a threshold amount of disk space (e.g., the amount of available disk space is less than 5 TB). A threshold amount of disk space may be required in situations where the original snapshot chain (or blob-chain) needs to remain available while a consolidation operation or rebasing operation is generating a new full image snapshot. A consolidation operation may be used to combine multiple consecutive incremental snapshots in a snapshot chain into a single snapshot. A rebasing operation may be used to move the full image snapshot for a snapshot chain to (or closer to) the most recent snapshot within the snapshot chain. One benefit of storing a data set being backed-up using a plurality of independently managed snapshot chains that limit the size of the full image snapshots per snapshot chain to be less than a threshold data size (e.g., less than 5 TB) is that working-copy during reversals and consolidations may be less of a problem in data storage clusters with high storage utilization. Moreover, each of the independently managed snapshot chains may be replicated in parallel and read from or written to in parallel, thereby improving read and write performance.

Over time, the snapshots in a snapshot chain may be archived using an archival data store (e.g., an NFS datastore), cloud storage, object storage (e.g., data storage that manages or stores data as objects), or block storage. In some cases, disk space within the archival data store may be reclaimed by either consolidating or merging consecutive expired snapshots or by deleting expired snapshots. In other cases, the archived snapshots may be archived to an archival data store that does not have the ability to easily compute or generate full image snapshots. In these cases, rather than archiving an incremental snapshot corresponding with a particular snapshot, a full image snapshot of the particular snapshot may be generated and transferred to the archival data store instead. The transfer of the full image snapshot may allow a chain of dependencies supporting expired snapshots to be broken and for the expired snapshots to be deleted or consolidated on the archival data store. The generation of full image snapshots may be performed periodically in order to reduce the size of the dependency chains for the archived snapshots. One benefit of reclaiming disk space by consolidating and/or deleting expired snapshots is that available disk space may be increased and the costs associated with storing the archived data may be reduced.

In one embodiment, a set of electronic files may be partitioned into two or more sets of files including a first set of files and a second set of files. The set of electronic files may comprise numerous files (e.g., 40K files) stored across one or more storage devices that are split or partitioned based on the logical size or physical size of the files. In one example, the set of electronic files may be sorted lexographically and then partitioned such that each partition comprises at most 2 TBs of data. Each partition may map to a directory. Each partition may correspond with a snapshot chain. The set of electronic files may be identified using various search criteria. The search criteria may utilize wildcard characters or regular expressions to find files with matching filenames or other attributes. In this case, the set of electronic files may not necessarily correspond with all files stored within particular folders or directories and may instead comprise subsets of files stored within the folders or directories that match a specified pattern. In one example, the set of electronic files may be acquired from a hardware server. The first set of files may be backed-up using a first snapshot chain and the second set of files may be backed-up using a second snapshot chain. Once the snapshot chain length for the first snapshot chain reaches a threshold limit (e.g., has more than 100 incremental snapshots that depend from a full image snapshot for the first snapshot chain), a new full image snapshot may be acquired or generated in order to begin a new snapshot chain; in this case, the first snapshot chain may be broken and subsequent snapshots of the first set of files may be stored as incremental snapshots that derive from the new full image snapshot or include data changes that are relative to the new full image snapshot.

In some embodiments, the acquisition and generation of additional full image snapshots for subsequent point in time versions of the first set of files and the second set of files may be staggered in order to reduce the burden on a host hardware server or storage device storing the set of electronic files and to reduce the overhead of generating the additional full image snapshots at the same time. In one example, a first additional full image snapshot for the first snapshot chain corresponding with a first version of the first set of files may be acquired from a hardware server at a first point in time and a second additional full image snapshot for the second snapshot chain corresponding with a second version of the second set of files may be acquired from the hardware server at a second point in time subsequent to the first point in time. Further, a first consolidation operation (or an operation that generates a new full image snapshot) may be performed on the first snapshot chain at the second point in time and a second consolidation operation may be performed on the second snapshot chain at the first point in time. In this case, the first consolidation operation may be performed to generate another additional full image snapshot for the first snapshot chain by a storage appliance, such as storage appliance 170 in FIG. 1A, while the second additional full image snapshot for the second snapshot chain is acquired by the storage appliance from the hardware server, such as server 160 in FIG. 1A. To generate a full image snapshot locally on the storage appliance, the storage appliance may allocate compute and storage resources prior to performing an operation to generate the full image snapshot. Thus, two additional full image snapshots for two different partitions or two different snapshot chains may be acquired and stored at the same time while limiting the computational and memory overhead for both the hardware server and the storage appliance.

In one embodiment, the acquisition or generation of additional full image snapshots from a server may be staggered upon detection that a snapshot chain length has exceeded or will exceed a threshold length with the next snapshot (e.g., will be greater than ten incrementals). Prior to fetching data associated with the additional full image snapshots, a determination may be made as to whether any of the partitions will have a snapshot chain length that will exceed the threshold length; if so, then additional full image snapshots may be acquired for those partitions such that the snapshot chain length for those partitions will not be exceeded. In another embodiment, rather than waiting until the snapshot chain length will be exceeded with the next snapshot in a snapshot chain, additional full image snapshots may be preemptively acquired or generated even before the next snapshot exceeds the snapshot chain length.

In some embodiments, the staggering of the acquisition and/or local generation of full image snapshots across two or more snapshot chains corresponding with two or more data partitions may be performed in response to detecting that at least one of the two or more snapshot chains has reached or exceeded a maximum snapshot chain length. In one embodiment, upon detection that at least one of the two or more snapshot chains has reached the maximum snapshot chain length, full image snapshots may be acquired and/or generated for Ceil(N*P) number of partitions, wherein N is total number of partitions of the two or more data partitions and P is the maximum percentage of the partitions for which full image snapshots may be acquired and/or generated for a particular point in time version of the two or more data partitions. In one example, if there are ten total data partitions (e.g., N is equal to 10) and the maximum percentage of the partitions for which full image snapshots may be acquired for a particular point in time version of the two or more data partitions is 30% (e.g., P is equal to 0.3), then the number of full image snapshots that may be acquired for the particular point in time version of the two or more data partitions is Ceil(8*0.3) or three full image snapshots. In another example, the number of full image snapshots that may be acquired for the particular point in time version of the two or more data partitions may be Floor(8*0.3) or two full image snapshots.

In other embodiments, the staggering of the acquisition and/or local generation of full image snapshots across two or more snapshot chains corresponding with two or more data partitions may be performed preemptively (e.g., prior to the maximum snapshot chain lengths being exceeded) if the snapshot chain length for at least one of the two or more snapshot chains has reached D (e.g., the triggering snapshot chain length that is less than the maximum snapshot chain length) equal to C minus Ceil(1/P), wherein C is the maximum snapshot chain length and P is the maximum percentage of the partitions for which full image snapshots may be acquired and/or generated for a particular point in time version of the two or more data partitions. In one example, if the maximum snapshot chain length for the two or more snapshot chains is 20 (e.g., C is equal to 20) and the maximum percentage of the partitions for which full image snapshots may be acquired for a particular point in time version of the two or more data partitions is 20% (e.g., P is equal to 0.2), then the triggering snapshot chain length D will be 20 minus Ceil(1/0.2) or fifteen. In this case, once one of the two or more snapshot chains has reached a snapshot chain length of fifteen, then full image snapshots for subsets of the two or more snapshot chains may be acquired and/or generated per snapshot for the next five snapshots. In the case that there are ten total data partitions (e.g., N is equal to 10), then two full image snapshots (e.g., N*P is equal to two) may be acquired for each of the snapshots from the sixteenth snapshot to the twentieth snapshot. Thus, for ten data partitions (P1, P2, P3, P4, P5, P6, P7, P8, P9, P10), at the fifteenth snapshot of the ten data partitions the corresponding snapshot chain lengths may be (15,15,15,15,15, 15,15,15,15,15), at the sixteenth snapshot of the ten data partitions the corresponding snapshot chain lengths may be (16,16,16,16,16,16,16,16,0,0), at the seventeenth snapshot of the ten data partitions the corresponding snapshot chain lengths may be (17,17,17,17,17,17,0,0,1,1), at the eighteenth snapshot of the ten data partitions the corresponding snapshot chain lengths may be (18,18,18,18,0,0,1,1,2,2), at the nineteenth snapshot of the ten data partitions the corresponding snapshot chain lengths may be (19,19,0,0,1,1,2,2, 3,3), and at the twentieth snapshot of the ten data partitions the corresponding snapshot chain lengths may be (0,0,1,1, 2,2,3,3,4,4).

An entire data set being backed-up may be partitioned into two or more partitions and each partition may correspond with a set of data blocks. A full image snapshot for one of the partitions may comprise a plurality of data blocks (e.g., 1500 64 MB data blocks). In some cases, an additional full image snapshot may be acquired or generated in order to limit the snapshot chain length of a snapshot chain. For example, the additional full image snapshot may be acquired from a hardware server to limit the number of forward incremental snapshots that need to be applied to a previously acquired full image snapshot to not more than twenty incrementals. In other cases, an additional full image snapshot may be acquired or generated in order to limit the maximum block chain length for the plurality of data blocks. A block chain length for a particular data block of the plurality of data blocks may correspond with the number of incremental snapshots separating the most recent data changes to the particular data block and the most recent snapshot of the plurality of data blocks. In some cases, a block chain length for a first data block of the plurality of data blocks may correspond with a number of incremental snapshots from a prior snapshot of the plurality of data blocks that includes the most recent data changes to the first block to the most recent snapshot of the plurality of data blocks. The maximum block chain length may comprise the greatest block chain length out of the block chain lengths for the plurality of data blocks. In other cases, an additional full image snapshot may be acquired or generated in order to limit the aggregate block chain length for the plurality of data blocks. The aggregate block chain length may comprise the sum of the block chain lengths for each block of the plurality of data blocks. One benefit of limiting the aggregate block chain length is that the time to synthesize a full image snapshot or generate an incremental snapshot may be reduced as the number of older data blocks that need to be read to check for data changes will be limited.

In some cases, one or more configuration parameters for a data storage system may be used to set the maximum snapshot chain length, the maximum block chain length, and the maximum aggregate block chain length. The maximum snapshot chain length, the maximum block chain length, and the maximum aggregate block chain length may be set based on an amount of available disk space within one or more data storage nodes of a cluster, which may increase or decrease over time as storage nodes are added to or removed from the cluster and as files are added to or deleted from the cluster. In one example, if the amount of available disk space falls below a threshold amount (e.g., is less than 10 TBs), then the maximum block chain length may be increased from 50 to 100. In another example, if the amount of available disk space rises above a threshold amount (e.g., is more than 50 TBs due to the addition of one or more data storage nodes to the cluster), then the maximum block chain length may be decreased from 200 to 50. As the amount of available disk space rises, the maximum block chain length may be decreased in order to improve recovery time or access efficiency at the expense of storage efficiency. The maximum snapshot chain length, the maximum block chain length, and the maximum aggregate block chain length may also be set based on a prior history of data changes or based on an average data change rate for a snapshot chain. In one example, if a threshold number of data changes have occurred within a snapshot chain (e.g., within the most recent ten snapshots), then the maximum block chain length may be increased from 10 to 20.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
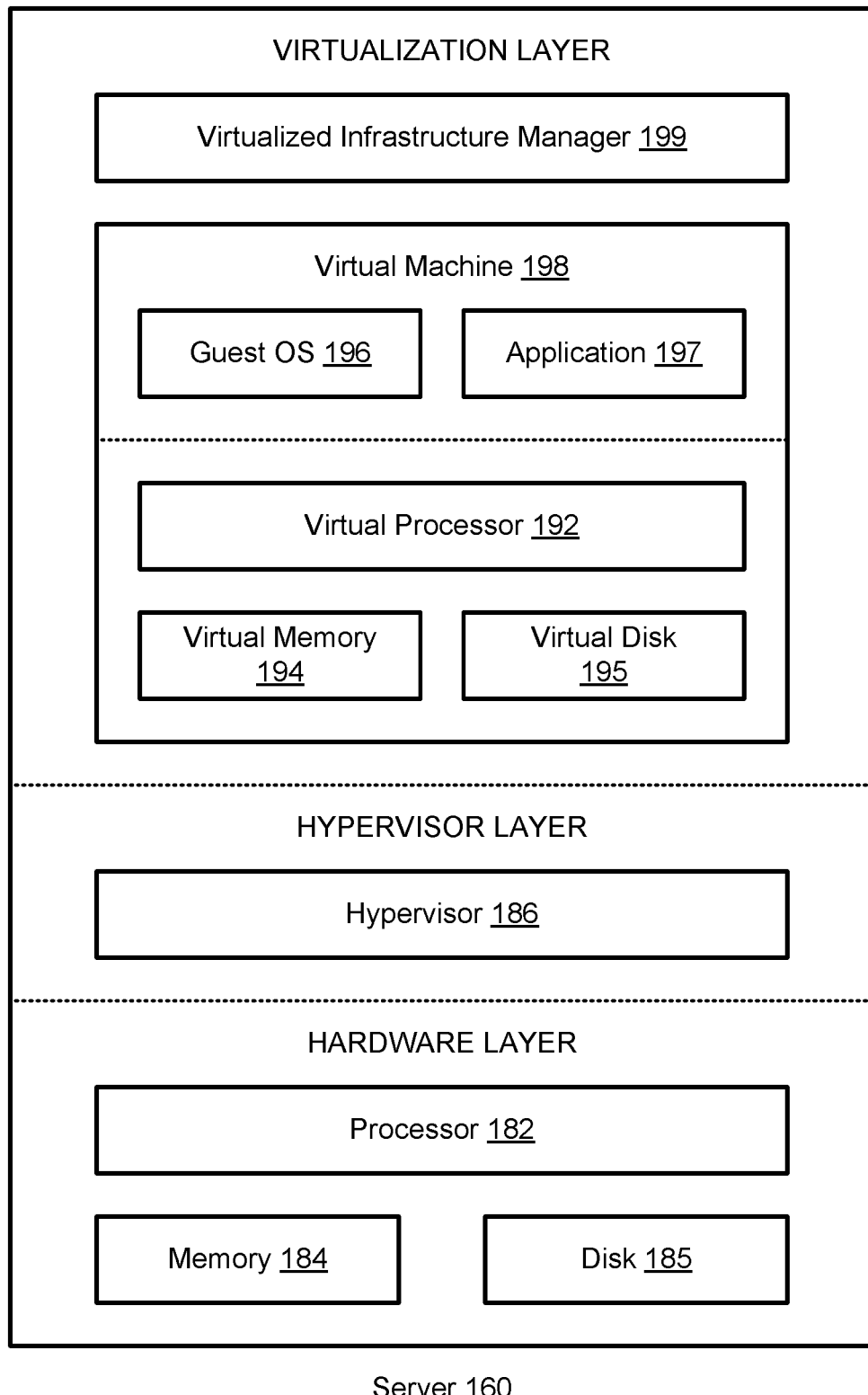
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
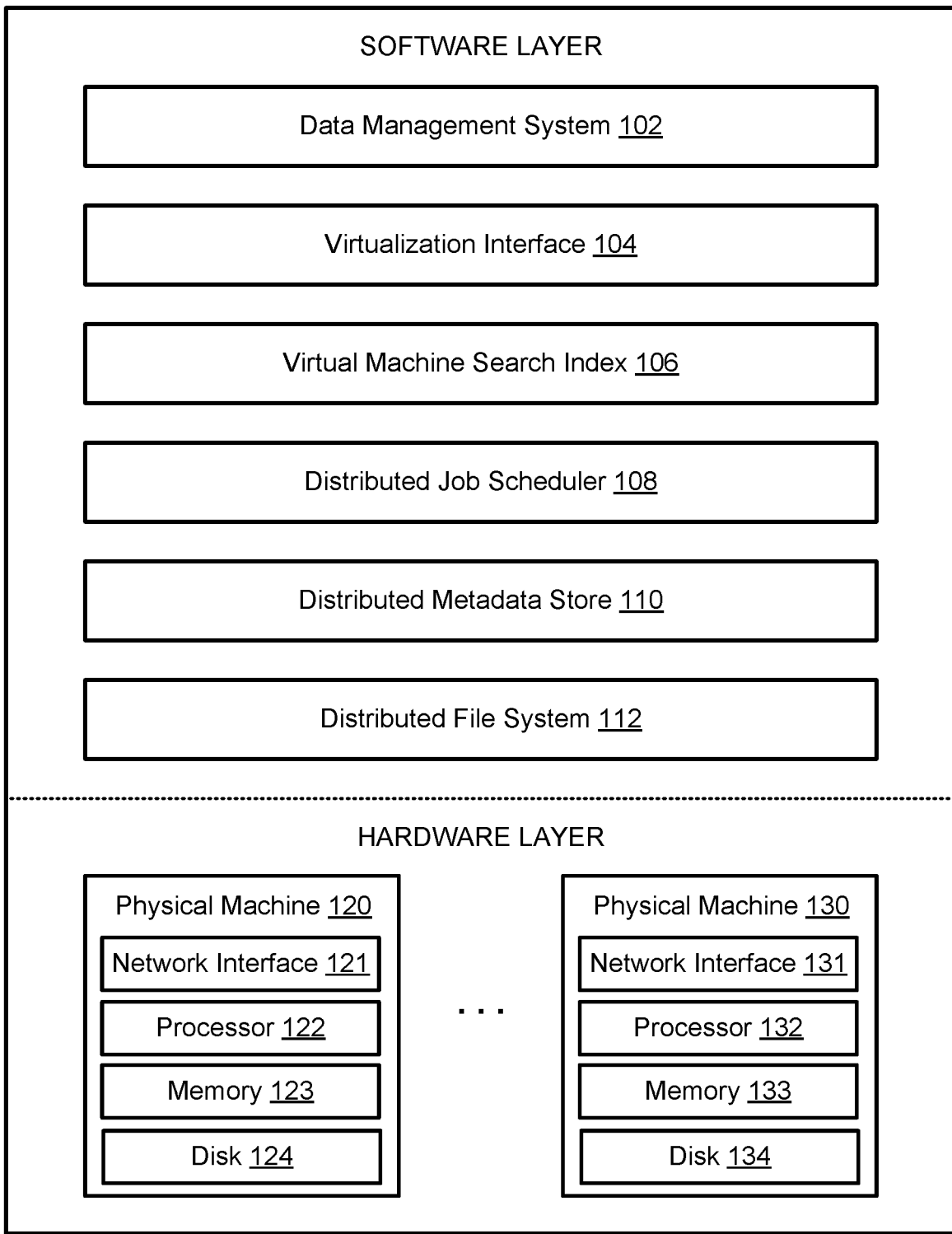
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks within the cluster may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a solid-state storage device, such as a solid-state drive (SSD) or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. The concepts described herein may also be applicable to managing versions of a real machine or versions of electronic files. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualized infrastructure, such as the virtualized infrastructure manager 199 in FIG. 1B, and for requesting data associated with virtual machine snapshots from the virtualized infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
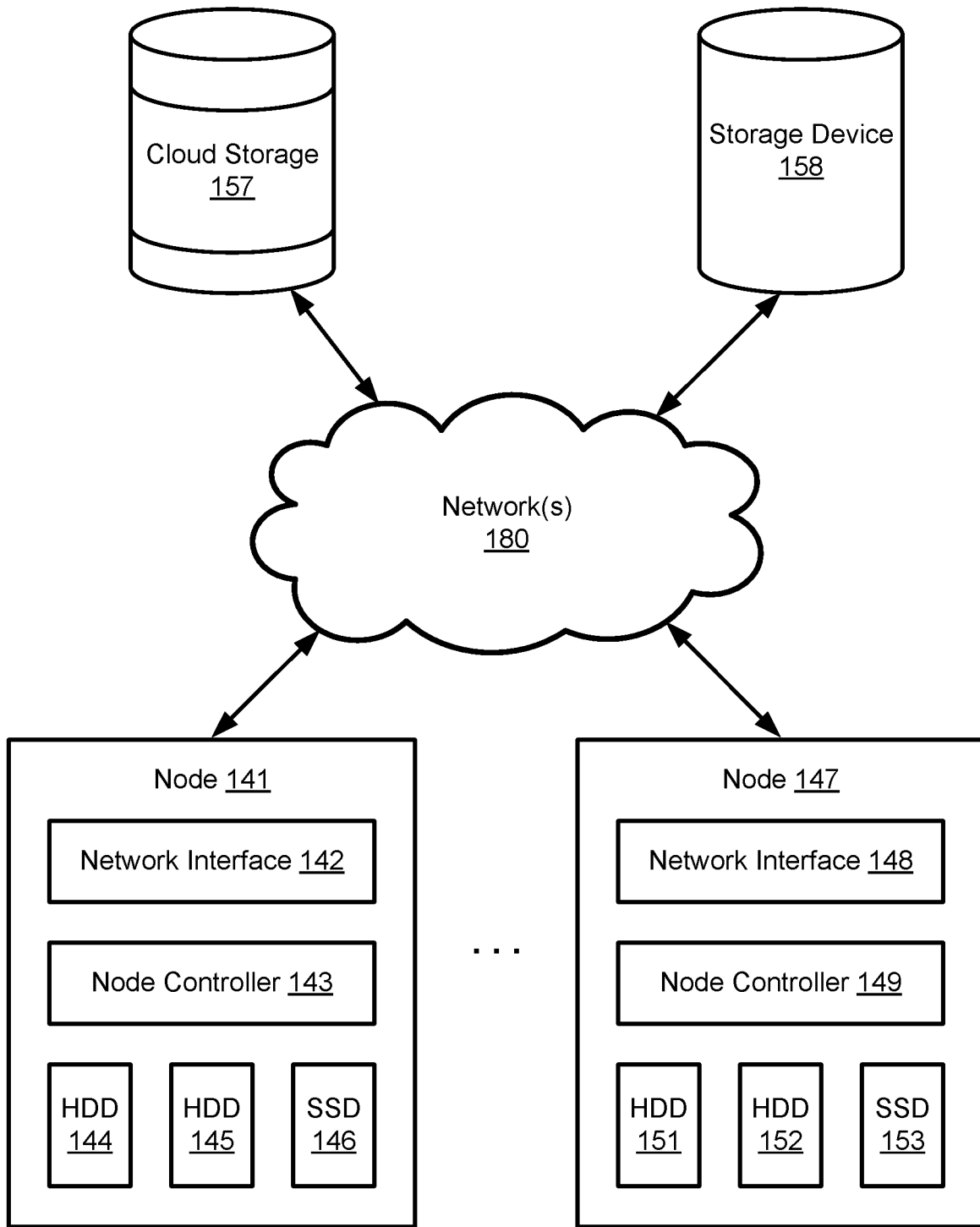
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

FIGS. 2A-2K depict various embodiments of sets of files and data structures (e.g., implemented using merged files) associated with managing and storing snapshots of virtual machines. Although various embodiments may be described in reference to the management of virtual machine snapshots, the concepts may be applied to the management of other data snapshots as well, such as snapshots of databases, filesets (e.g., Network Attached Storage filesets), and sets of electronic files.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6 and may comprise one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path/snapshots/VM_A/s6/s6.delta), and a third pointer (pF2) that references the forward incremental F2 (e.g., via the path /snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path /snapshots/VM_A/s4/s4.delta), a third pointer (pR2) that references the reverse incremental R2 (e.g., via the path /snapshots/VM_A/s3/s3.delta), and a fourth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

Figures 2D, 2E, 2F:
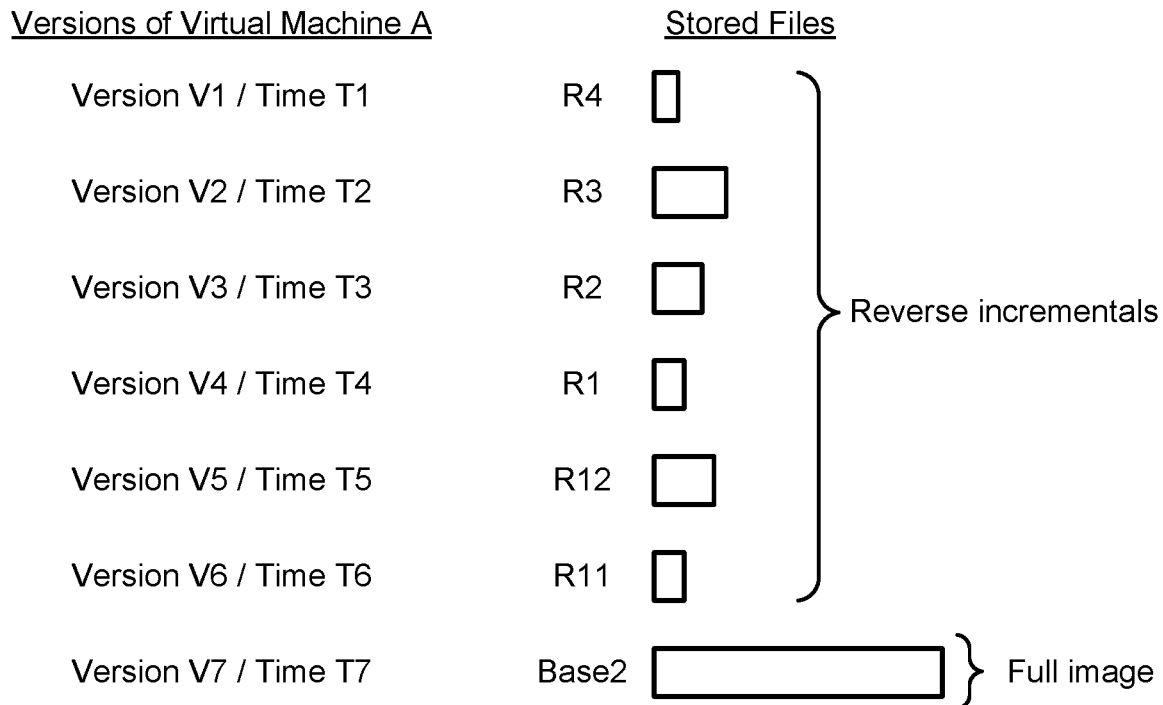

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) may be triggered when a number of forward incremental files is greater than a threshold number of forward incremental files for a snapshot chain (e.g., more than 200 forward incremental files). In other cases, a rebasing operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path /snapshots/VM_A/s6/s6.delta), a third pointer (pR12) that references the reverse incremental R12 (e.g., via the path /snapshots/VM_A/s5/ s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

Figures 2G, 2H, 2I:
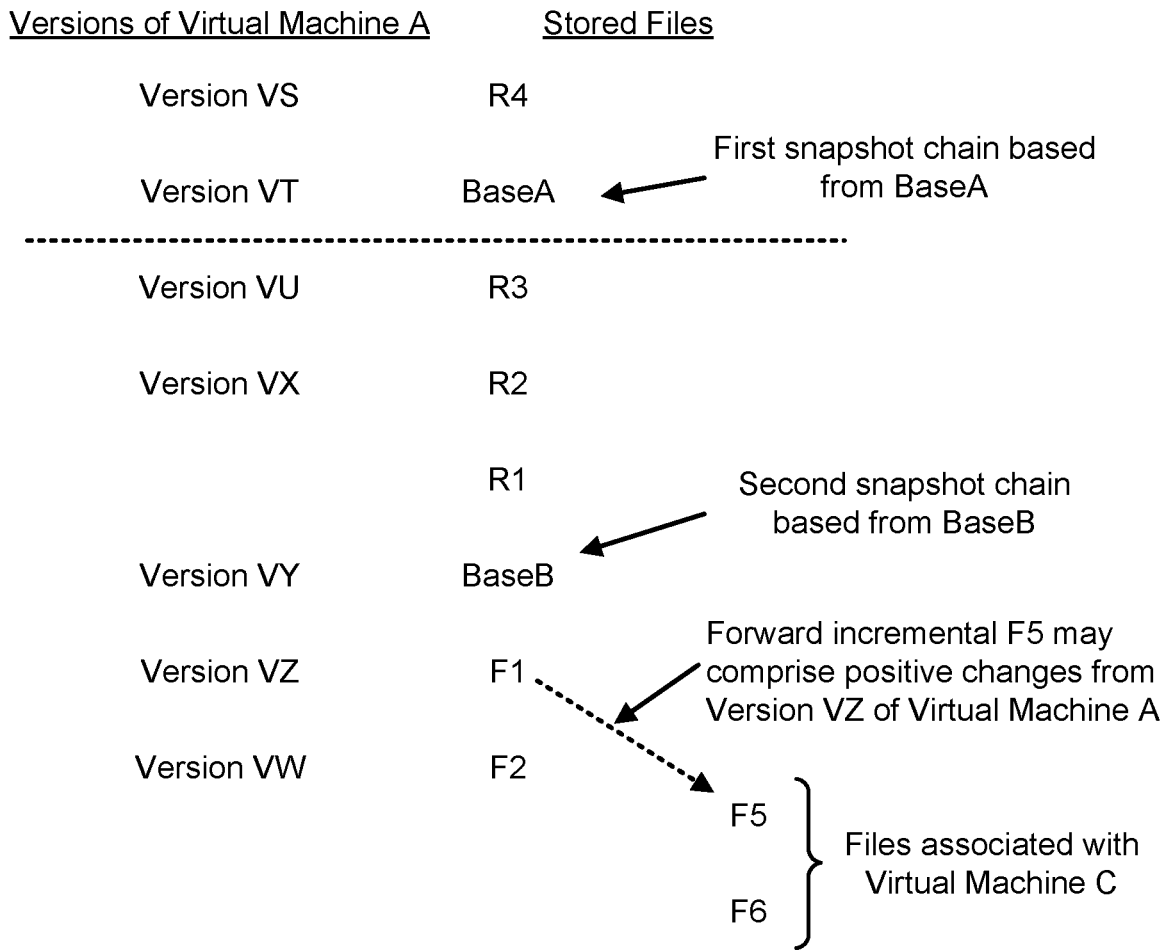

FIG. 2G depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB) acting as the anchor snapshot for the second snapshot chain, the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files). In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2H depicts one embodiment of a merged file for generating version VS of Virtual Machine A using the set of files depicted in FIG. 2G. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2I depicts one embodiment of a merged file for generating version VU of Virtual Machine A using the set of files depicted in FIG. 2G. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

Figures 2J, 2K:
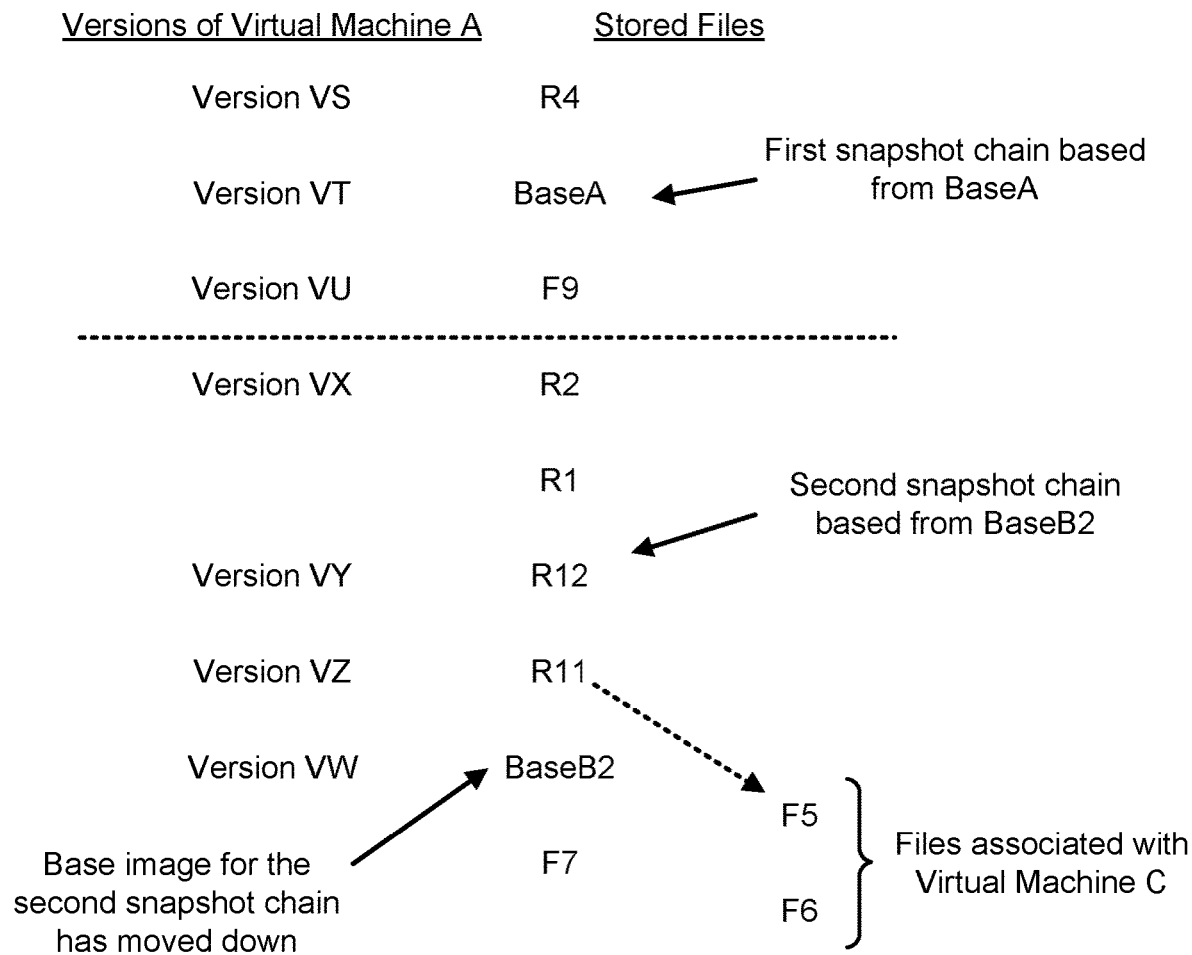

FIG. 2J depicts one embodiment of a set of files associated with multiple virtual machine snapshots after a rebasing process has been performed to a snapshot chain using the set of files in FIG. 2G. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version VU of Virtual Machine A using the set of files depicted in FIG. 2J. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), an existing snapshot chain (e.g., the first snapshot chain depicted in FIG. 2J) may have its chain length extended or snapshots previously assigned to the second snapshot chain may be moved to the existing snapshot chain. For example, the first snapshot chain depicted in FIG. 2G comprises two total snapshots, while the first snapshot chain depicted in FIG. 2J comprises three total snapshots as the snapshot corresponding with version VU of Virtual Machine A has moved from the second snapshot chain to the first snapshot chain.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

Figure 3A:
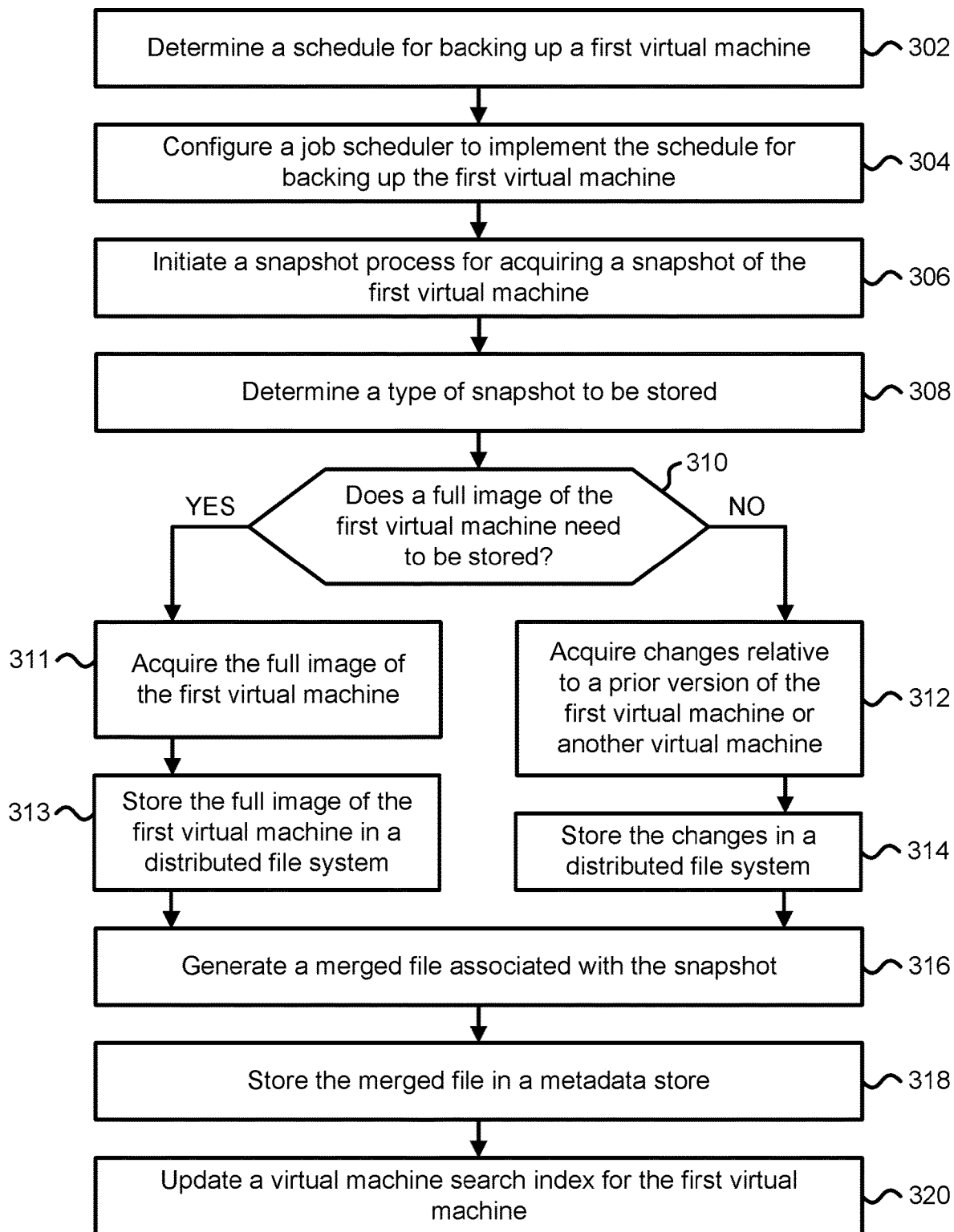
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operating system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
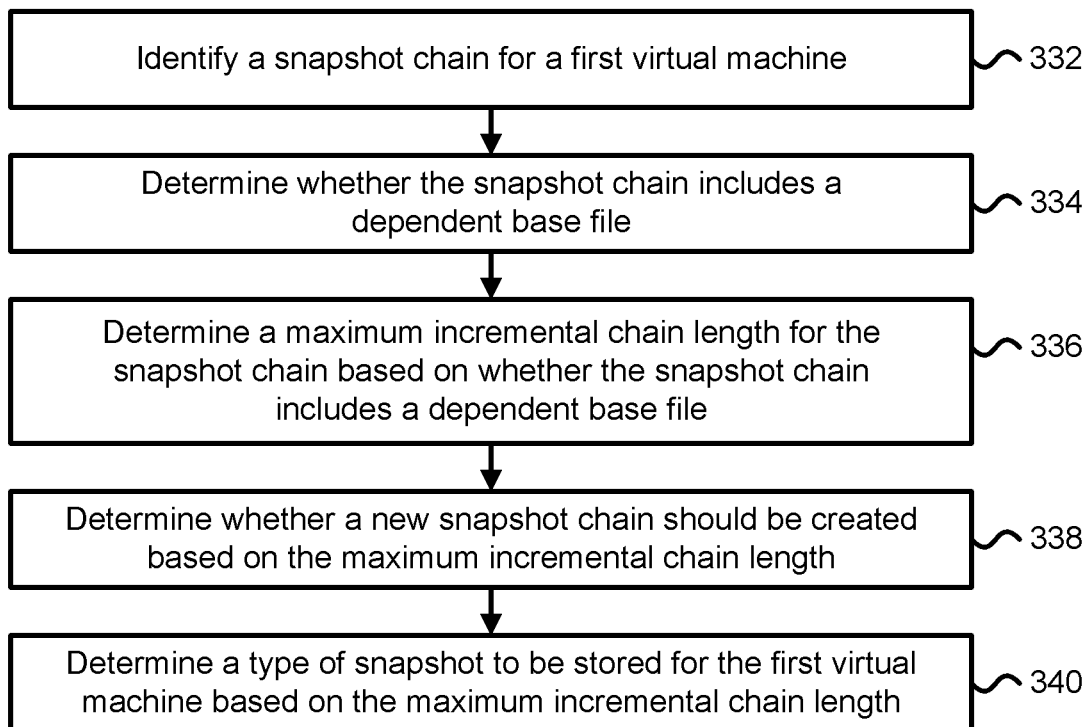
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

Figure 3C:
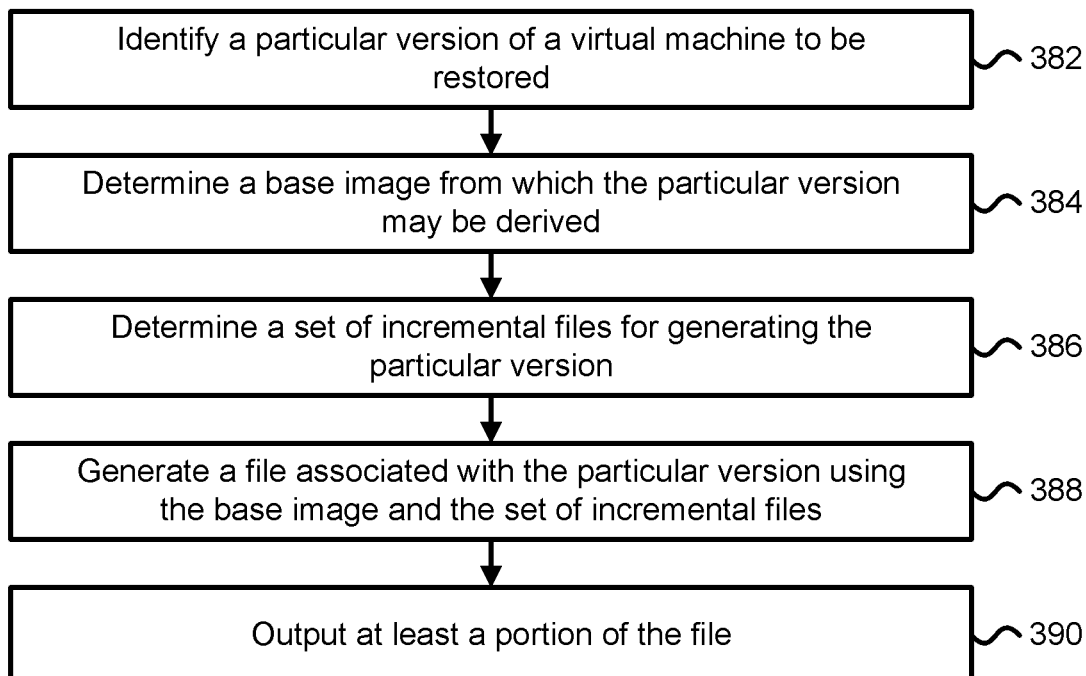
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and/or one or more reverse incremental files. In step 388, a file associated with the particular version is generated using the base image and the set of incremental files. The file may be generated by patching the set of incremental files onto the base image. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine.

FIG. 4A depicts one embodiment of sets of electronic files for capturing different point in time versions of protected data, such as a fileset or a virtual machine. The sets of electronic files may be stored using a distributed file system, such as distributed file system 112 in FIG. 1C. As depicted, a first set of files corresponding with a snapshot chain includes a set of reverse incrementals (R1-R4), a full image 402 (Base), and a set of forward incrementals (F1-F2). The different point in time versions of the virtual machine (versions V1-V7 of Virtual Machine VM) were captured and stored using the first set of files. The first set of files may be partitioned or split into two or more snapshot sub-chains or shard chains. As depicted, the full image 402 (Base) may be partitioned into a first full image 404 (BaseA) and a second full image 406 (BaseB). In one example, the full image 402 may comprise an electronic file of size 1 TB, the first full image 404 may comprise an electronic file of size 500 GB, and the second full image 406 may comprise an electronic file of 500 GB. In another example, the full image 402 may comprise an electronic file of size 1 TB, the first full image 404 may comprise an electronic file of size 800 GB, and the second full image 406 may comprise an electronic file of 200 GB. The partitioning of the full image 402 may create a plurality of uniformly sized base images or a plurality of base images corresponding with a plurality of snapshot sub-chains that have uniform maximum data sizes or non-uniform maximum data sizes.

As depicted in FIG. 4A, a second set of files corresponding with a first snapshot sub-chain includes a set of reverse incrementals (RA1-RA4), a full image 404 (BaseA), and a set of forward incrementals (FA1-FA2). A third set of files corresponding with a second snapshot sub-chain includes a set of reverse incrementals (RB1-RB4), a full image 406 (BaseB), and a set of forward incrementals (FB1-FB2). The different point in time versions of the virtual machine (versions V1-V7 of Virtual Machine VM) may be generated and outputted using the second set of files corresponding with the first snapshot sub-chain and the third set of files corresponding with the second snapshot sub-chain.

In some cases, a first set of operations (e.g., reverse, consolidate, rebase, read, and/or write operations) may be performed on the second set of files corresponding with the first snapshot sub-chain independently of a second set of operations being performed on the third set of files corresponding with the second snapshot sub-chain. The first set of operations may comprise snapshot chain manipulation operations, such as a reverse operation or a consolidation operation, that generate new files for a snapshot chain or a snapshot sub-chain. In one example, the full image 404 may be read in parallel with the full image 406. In another example, a first rebasing operation may be performed on the first snapshot sub-chain while a second rebasing operation may be performed on the second snapshot sub-chain. In this case, the first rebasing operation may generate a new first base image for the first snapshot sub-chain and the second rebasing operation may generate a new second base image for the second snapshot sub-chain. The generated base images may be aligned such that the new first base image may correspond with a particular version of the virtual machine (e.g., Version V7 of the Virtual Machine VM) and the new second base image may correspond with the particular version of the virtual machine. In some cases, the generated base images may not be aligned such that the new first base image may correspond with a particular version of the virtual machine (e.g., Version V7 of the Virtual Machine VM) and the new second base image may correspond with a different version of the virtual machine (e.g., Version V6 of the Virtual Machine VM).

In some embodiments, the determination of whether to convert or split the first set of files corresponding with the snapshot chain into the second set of files corresponding with the first snapshot sub-chain and the third set of files corresponding with the second snapshot sub-chain may depend upon the detection of one or more triggering conditions. The triggering conditions may include detection that the amount of available disk space has fallen below a threshold amount of available disk space (e.g., has fallen below or is less than 20 TB), detection that there has been a change in snapshot frequency (e.g., the snapshot frequency may have changed from capturing snapshots every 6 hours to every 4 hours), detection that the total number of snapshots captured for the virtual machine is greater than a threshold number (e.g., the total number of snapshots has exceeded more than 1000 snapshots or the total number of point in time versions backed-up for the virtual machine has exceeded more than 400 versions), detection that the aggregate file sizes of the first set of files has exceeded a threshold file size, and/or detection that the amount of disk space required for the first set of files has exceeded a threshold amount of disk space (e.g., the first set of files requires more than 400 GBs of disk space).

FIG. 4B depicts one embodiment of a snapshot chain including a base image and one or more incrementals that derive from the base image being converted or split into a first snapshot sub-chain 414 and a second snapshot sub-chain 416. In some cases, the first snapshot sub-chain 414 and the second snapshot sub-chain 416 may have uniform widths or maximum files sizes. In one example, the files corresponding with the first snapshot sub-chain 414 may have a maximum file size (e.g., files sizes not greater than 1 TB) and the files corresponding with the second snapshot sub-chain 416 may also have the same maximum file size.

FIG. 4C depicts one embodiment of a snapshot chain including a base image and one or more incrementals that derive from the base image being converted or split into a first snapshot sub-chain 414 and a second snapshot sub-chain 416. As depicted, the first snapshot sub-chain 414 and the second snapshot sub-chain 416 may have different widths or different maximum files sizes. In one example, the files corresponding with the first snapshot sub-chain 414 may have a first maximum file size (e.g., files sizes not greater than 1 TB) and the files corresponding with the second snapshot sub-chain 416 may have a second maximum file size (e.g., files sizes not greater than 500 GB) different from the first maximum file size.

Figure 4D:
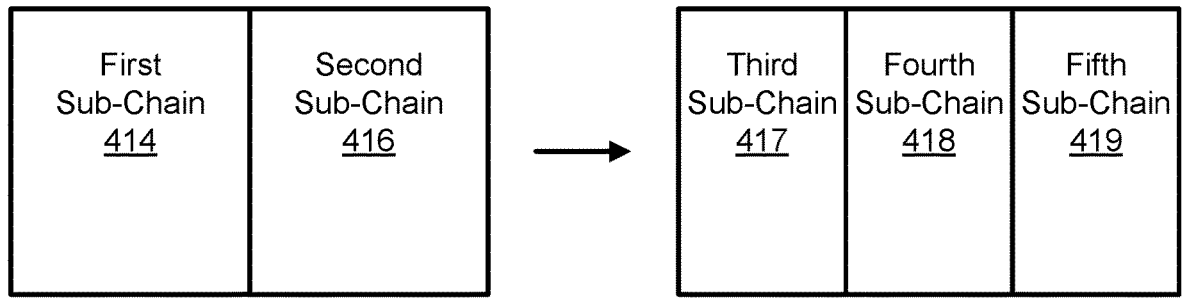
FIG. 4D depicts one embodiment of two snapshot sub-chains being split into three snapshot sub-chains.

FIG. 4D depicts one embodiment of two snapshot sub-chains 414 and 416 being converted into three snapshot sub-chains 417-419. In this case, the first snapshot sub-chain 414 may include a first base image and a first set of incrementals that derive from the first base image and the second snapshot sub-chain 416 include a second base image and a second set of incrementals that derive from the second base image. The three snapshot sub-chains 417-419 may include a third snapshot sub-chain 417, a fourth snapshot sub-chain 418, and a fifth snapshot sub-chain 419. The third snapshot sub-chain 417 may include a third base image and a third set of incremental files that derive from the third base image. The fourth snapshot sub-chain 418 may include a fourth base image and a fourth set of incremental files that derive from the fourth base image. The fifth snapshot sub-chain 419 may include a fifth base image and a fifth set of incremental files that derive from the fifth base image. The first base image of the first snapshot sub-chain 414 and the second base image of the second snapshot sub-chain 416 may be used to generate a combined base image corresponding with a particular version of a virtual machine. The third base image of the third snapshot sub-chain 417, the fourth base image of the fourth snapshot sub-chain 418, and the fifth base image of the fifth snapshot sub-chain 419 may be used to also generate the combined base image corresponding with the particular version of the virtual machine.

In some embodiments, the determination of whether to increase the number of snapshot sub-chains (e.g., by converting or splitting two snapshot sub-chains into three snapshot sub-chains) may depend upon the detection of one or more triggering conditions. The triggering conditions may include detection that the amount of available disk space has fallen below a threshold amount of available disk space (e.g., has fallen below or is less than 10 TB), detection that there has been a change in snapshot frequency (e.g., the snapshot frequency may have changed from capturing snapshots every 24 hours to every 4 hours), detection that the total number of snapshots captured for the virtual machine has exceeded a threshold number (e.g., the total number of snapshots has exceeded more than 1000 snapshots), detection versions), detection that the aggregate file sizes of the snapshots has exceeded a threshold file size, and/or detection that the amount of disk space required for the snapshots has exceeded a threshold amount of disk space (e.g., the snapshots require more than 800 GBs of disk space).

Figure 4E:
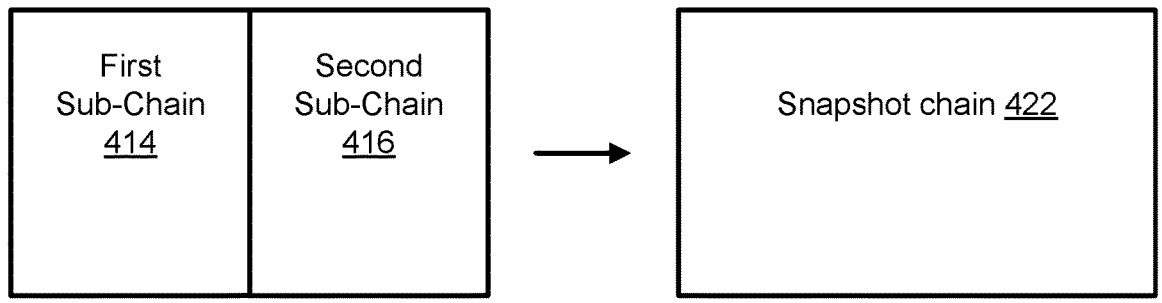
FIG. 4E depicts one embodiment of two snapshot sub-chains being consolidated into a consolidated snapshot chain.

FIG. 4E depicts one embodiment of two snapshot sub-chains 414 and 416 being consolidated into a consolidated snapshot chain 422. In this case, the first snapshot sub-chain 414 may include a first base image and a first set of incrementals that derive from the first base image and the second snapshot sub-chain 416 include a second base image and a second set of incrementals that derive from the second base image. The consolidated snapshot chain 422 may include a third base image and a third set of incrementals that derive from the third base image. The third base image may be equivalent to the combination of the first base image and the second base image. The third base image may correspond with a full image snapshot of a particular version of a virtual machine. A combination of the first base image and the second base image may also correspond with the full image snapshot of the particular version of the virtual machine.

In some embodiments, the determination of whether to decrease the number of snapshot sub-chains (e.g., by consolidating two snapshot sub-chains into a single snapshot chain) may depend upon the detection of one or more triggering conditions. The triggering conditions may include detection that the amount of available disk space is greater than a threshold amount of available disk space (e.g., has risen to be greater than 50 TB), detection that there has been a change in snapshot frequency (e.g., the snapshot frequency may have changed from capturing snapshots every 4 hours to every 24 hours), and/or detection that the total number of backed-up versions for the virtual machine is less than a threshold number (e.g., due to consolidation of previously captured snapshots of the virtual machine, the total number of back-up versions for the virtual machine has fallen below 500 versions of the virtual machine).

Figure 4F:
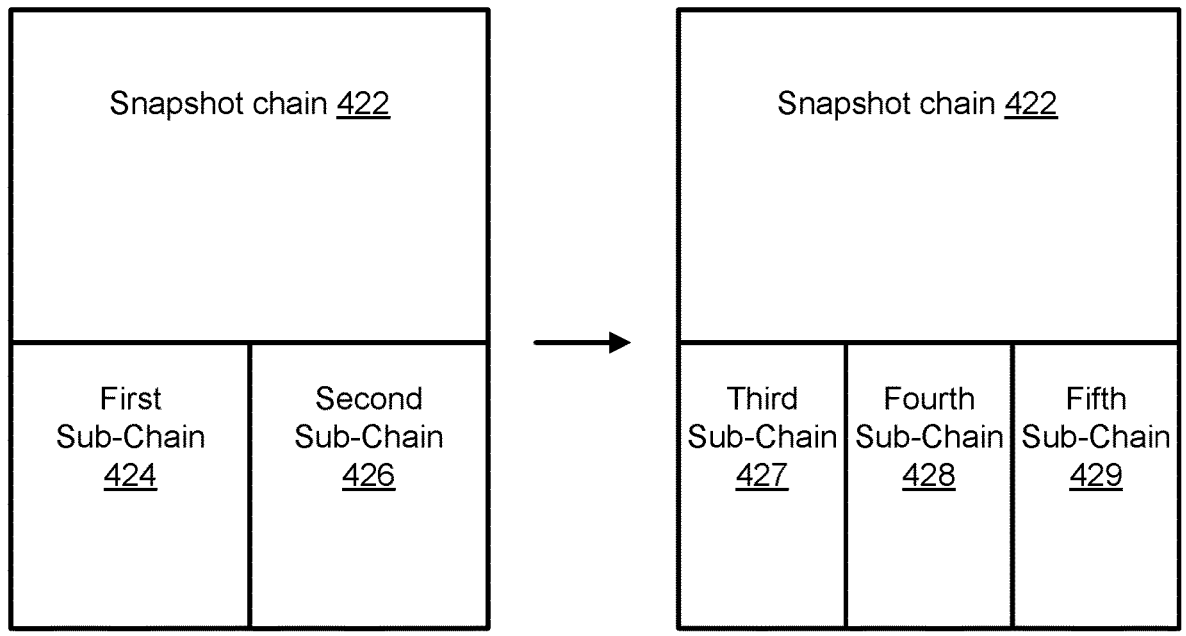
FIG. 4F depicts one embodiment of converting a portion of a snapshot chain into two or more snapshot sub-chains.

FIG. 4F depicts one embodiment of converting a portion of a snapshot chain into two or more snapshot sub-chains. As depicted, different point in time versions of a virtual machine have been captured and stored as a first set of files corresponding with the snapshot chain 422, a second set of files corresponding with the first snapshot sub-chain 424, and a third set of files corresponding with the second snapshot sub-chain 426. The second set of files corresponding with the first snapshot sub-chain 424 and the third set of files corresponding with the second snapshot sub-chain 426 may be converted into the three snapshot sub-chains 427-429.

In one embodiment, a portion of a snapshot chain (e.g., corresponding with the 100 most recent versions of a virtual machine out of 200 total versions of the virtual machine) may be split into two or more sub-chains. In another embodiment, a first set of backed-up versions of a virtual machine (e.g., versions V1-V100) may be stored as a first set of files corresponding with a single snapshot chain, such as snapshot chain 422 in FIG. 4F, and a second set of backed-up versions of the virtual machine (e.g., versions V101-V200) may be stored as files corresponding with two or more snapshot sub-chains, such as snapshot sub-chains 424 and 426 in FIG. 4F. Upon detection that an amount of available disk space for a cluster has fallen below a threshold amount of disk space, the two or more snapshot sub-chains may be converted into three or more snapshot sub-chains, such as snapshot sub-chains 427-429 in FIG. 4F.

In some embodiments, a first set of versions of a virtual machine may correspond with a top snapshot chain (e.g., snapshot chain 422 in FIG. 4F) and a second set of versions of the virtual machine may correspond with two or more snapshot sub-chains (e.g., snapshot sub-chains 424 and 426 in FIG. 4F). The top snapshot chain may be stored using a storage appliance, such as storage appliance 140 in FIG. 1A, or stored using a remote cluster repository (e.g., older snapshots may be moved to a second data center) or a cloud repository. The two or more snapshot sub-chains may be stored using the same storage appliance as that used to store the top snapshot chain. In some cases, the top snapshot chain may be stored using a remote cluster repository (e.g., located within a second data center) or a cloud repository and the bottom snapshot chain may be stored using a local storage appliance.

Figure 4G:
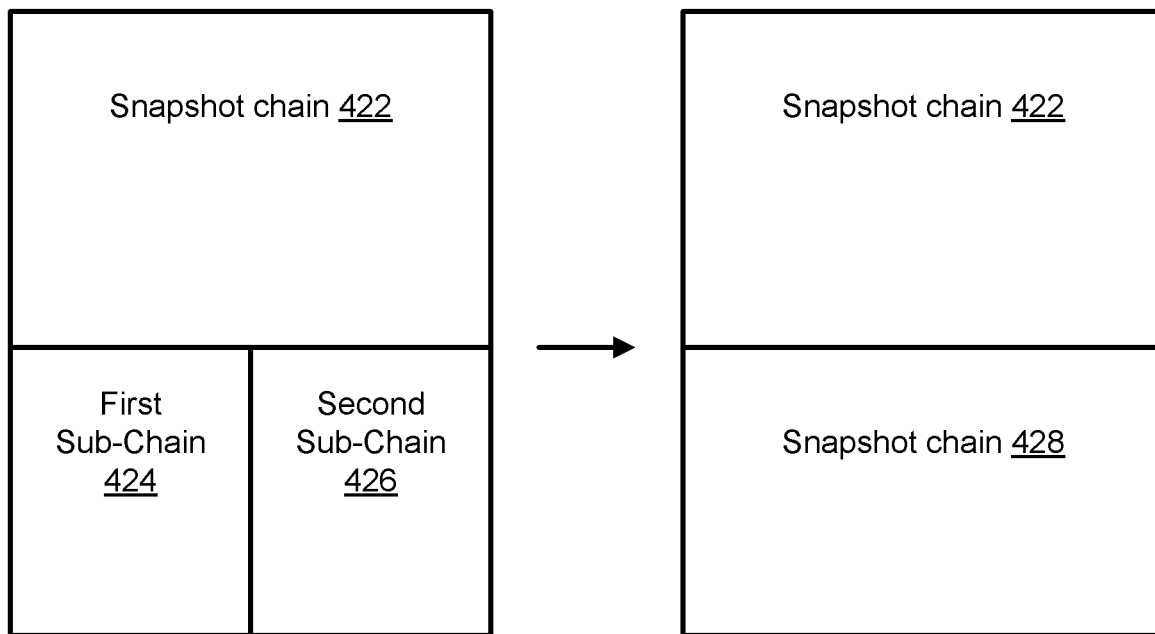
FIG. 4G depicts one embodiment of consolidating snapshot sub-chains associated with a subset of backed-up versions of protected data into a single snapshot chain.

FIG. 4G depicts one embodiment of consolidating snapshot sub-chains associated with a subset of backed-up versions of protected data (e.g., a virtual machine or a large file set comprising 500K files) into a single snapshot chain. As depicted, different point in time versions of a virtual machine have been captured and stored as a first set of files corresponding with the snapshot chain 422, a second set of files corresponding with the first snapshot sub-chain 424, and a third set of files corresponding with the second snapshot sub-chain 426. The second set of files corresponding with the first snapshot sub-chain 424 and the third set of files corresponding with the second snapshot sub-chain 426 may be consolidated into a single snapshot chain 428.

Figure 4H:
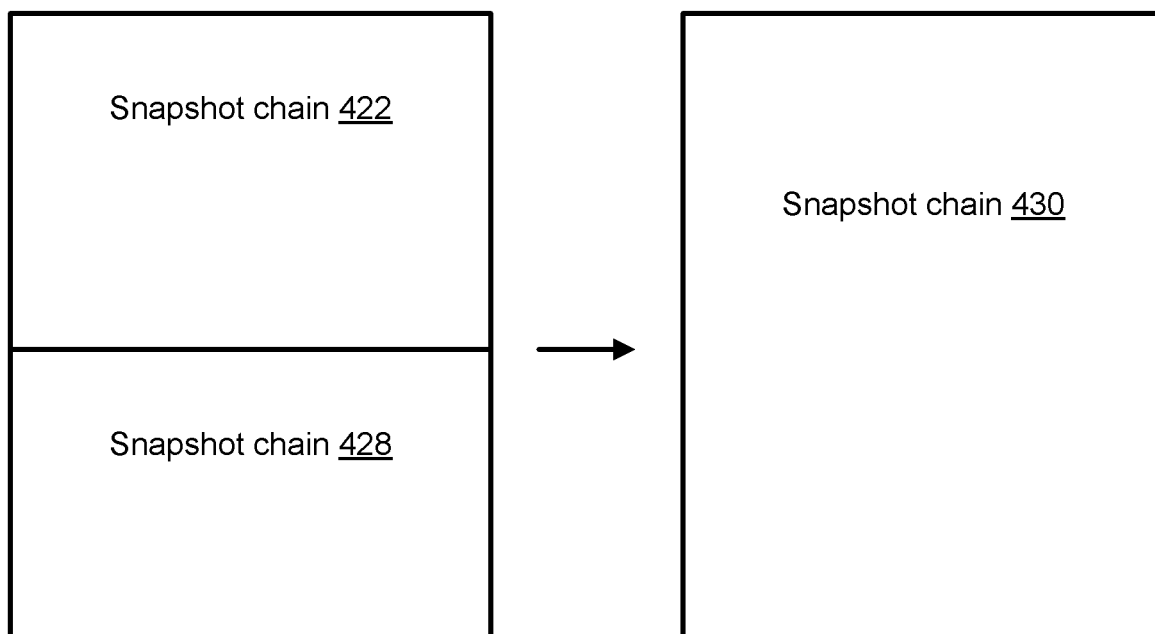
FIG. 4H depicts one embodiment of consolidating two snapshot chains into a single snapshot chain.

FIG. 4H depicts one embodiment of consolidating two snapshot chains into a single snapshot chain. As depicted, a first snapshot chain 422 may correspond with a first set of backed-up versions of a virtual machine (e.g., versions V1-V500) and a second snapshot chain 428 may correspond with a second set of backed-up versions of the virtual machine (e.g., versions V501-V600). The first snapshot chain 422 and the second snapshot chain 428 may be consolidated into a third snapshot chain 430. The third snapshot chain 430 may correspond with both the first set of backed-up versions of the virtual machine and the second set of backed-up versions of the virtual machine (e.g., versions V1-V600). The first snapshot chain 422 may include a first base image and a first set of incremental files that derive from the first base image. The second snapshot chain 428 may include a second base image and a second set of incremental files that derive from the second base image. The third snapshot chain 430 may include a third base image and a third set of incremental files that derive from the third base image. In some cases, the total number of electronic files for the third snapshot chain 430 may be equal to the number of electronic files for the first snapshot chain 422 plus the number of electronic files for the snapshot chain 428. One benefit of consolidating snapshot chains is that the number of base images (or full image snapshots) may be reduced.

In some embodiments, different versions of a virtual machine may correspond with a top snapshot chain (e.g., snapshot chain 422 in FIG. 4H) used for storing a first set of the different versions of the virtual machine and a bottom snapshot chain (e.g., snapshot chain 428 in FIG. 4H) used for storing a second set of the different versions of the virtual machine. Upon detection of a triggering event (e.g., the amount of available disk space has fallen below a threshold amount of disk space due to a node failure), the bottom snapshot chain may be split into two or more snapshot sub-chains or both the top snapshot chain and the bottom snapshot chain may both be split into two or more snapshot sub-chains. In some cases, the top snapshot chain may correspond with the first snapshot chain depicted in FIG. 2J and the bottom snapshot chain may correspond with the second snapshot chain depicted in FIG. 2J.

FIG. 4I depicts one embodiment of the two snapshot sub-chains of FIG. 4A in which snapshot sub-chain operations have been independently performed on the two snapshot sub-chains. As depicted, a new base image 436 (BaseB2) and two reverse incremental files 437-438 (RB11-RB12) have been generated for the second snapshot sub-chain. In this case, a reverse operation may have been performed using the second snapshot sub-chain in order to move the base image for the second snapshot sub-chain closer to the most recent version of the virtual machine comprising version V7.

FIG. 4J depicts one embodiment of four snapshot chains that correspond with four data partitions comprising a set of electronic files to be backed-up. The set of electronic files may comprise a fileset and the four data partitions may comprise the fileset partitioned into four different data partitions. The snapshot chain (or sub-chain) with full image 404 (BaseA) and reverse incremental snapshots corresponding with reverse incremental files 442-443 (RA1 and RA2) depicted in FIG. 4I may comprise a first snapshot chain for a first partition of the four data partitions. The snapshot chain with full image 473 (BaseB) may comprise a second snapshot chain for a second partition of the four data partitions. The snapshot chain with full image 474 (BaseC) may comprise a third snapshot chain for a third partition of the four data partitions. The snapshot chain with full image 475 (BaseD) may comprise a fourth snapshot chain for a fourth partition of the four data partitions. As depicted, the four base images for the four data partitions have been staggered such that the full image 404 (BaseA) corresponds with Version V5 of the first snapshot chain, the full image 473 (BaseB) corresponds with Version V6 of the second snapshot chain, the full image 474 (BaseC) corresponds with Version V7 of the third snapshot chain, and the full image 475 (BaseD) corresponds with Version V8 of the fourth snapshot chain. The four base images may be acquired from a hardware server, such as server 160 in FIG. 1A, or generated by a storage appliance, such as storage appliance 170 in FIG. 1A, at four different points in time in order to limit the computational and storage demands placed on the hardware server or the storage appliance.

Figure 5A:
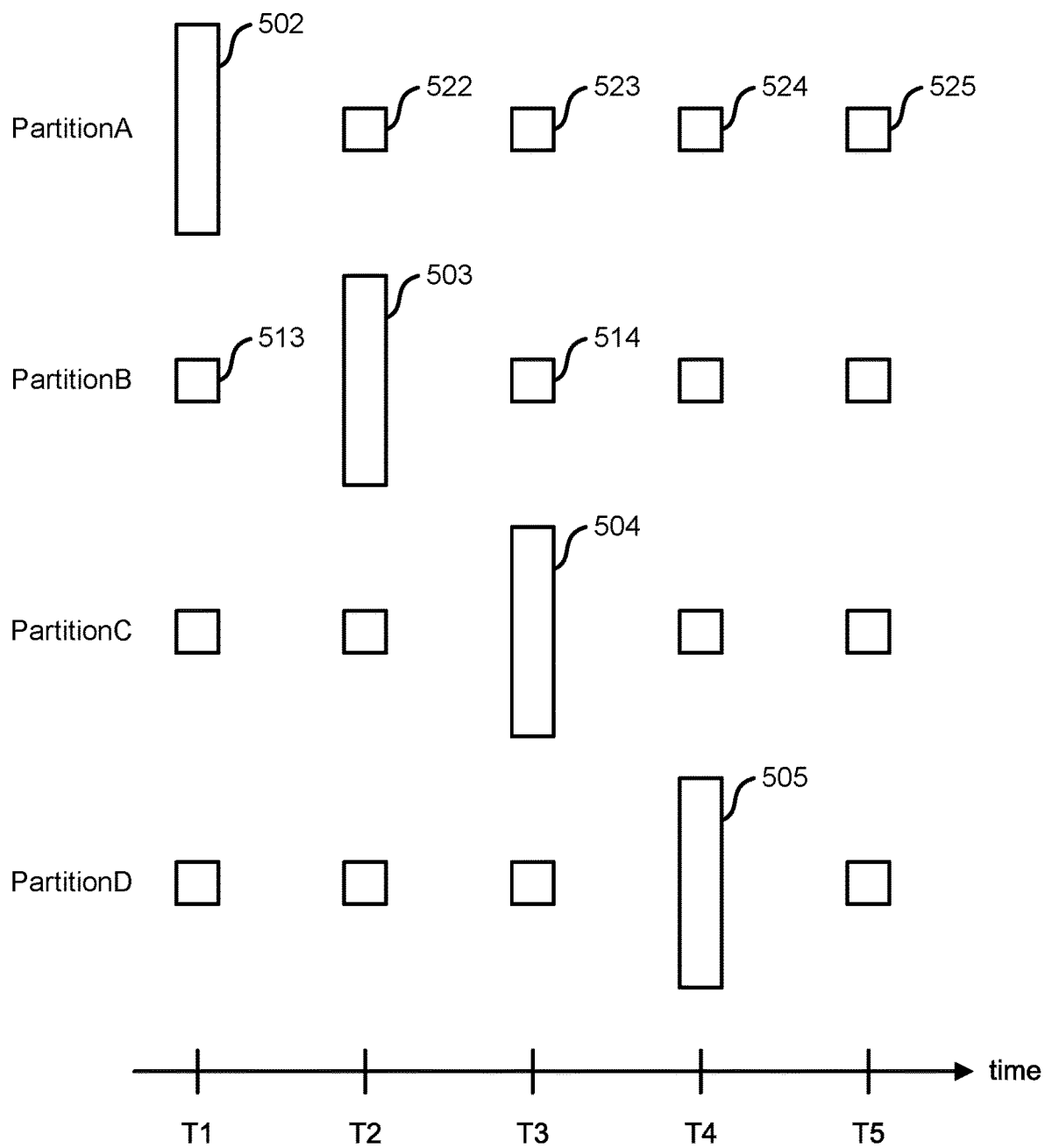
FIG. 5A depicts one embodiment of four snapshot chains corresponding with a set of electronic files that have been partitioned into four different data partitions.

FIG. 5A depicts one embodiment of four snapshot chains corresponding with a set of electronic files that have been partitioned into four different data partitions. The four data partitions comprise a first data partition PartitionA, a second data partition PartitionB, a third data partition PartitionC, and a fourth data partition PartitionD. The first snapshot chain of the four snapshot chains includes a first full image snapshot 502 and forward incremental snapshots 522-525. The second snapshot chain of the four snapshot chains includes a second full image snapshot 503, a reverse incremental snapshot 513, and a forward incremental snapshot 514. In some cases, the incremental snapshot 513 may comprise a forward incremental snapshot that derives from a previously acquired full image snapshot not depicted; in this case, the incremental snapshot 513 would be part of a different snapshot chain with the previously acquired full image snapshot as the anchor snapshot. The third snapshot chain of the four snapshot chains includes a third full image snapshot 504 and the fourth snapshot chain of the four snapshot chains includes a fourth full image snapshot 505. The point in time version for the set of electronic files at time T1 may correspond with a first version of the set of electronic files. Similarly, the point in time version for the set of electronic files at time T2 may correspond with a second version of the set of electronic files and the point in time version for the set of electronic files at time T3 may correspond with a third version of the set of electronic files. Therefore, the full image snapshots for the four snapshot chains have been staggered over the point in time versions of the set of electronic files. In one embodiment, the staggering of the four snapshot chains may be triggered upon detection that at least one of the snapshot chains has reached a triggering snapshot chain length that is less than a maximum snapshot chain length equal to C minus Ceil(1/P), wherein C is the maximum snapshot chain length and P is the maximum percentage of the partitions for which full image snapshots may be concurrently acquired and/or generated.

Figure 5B:
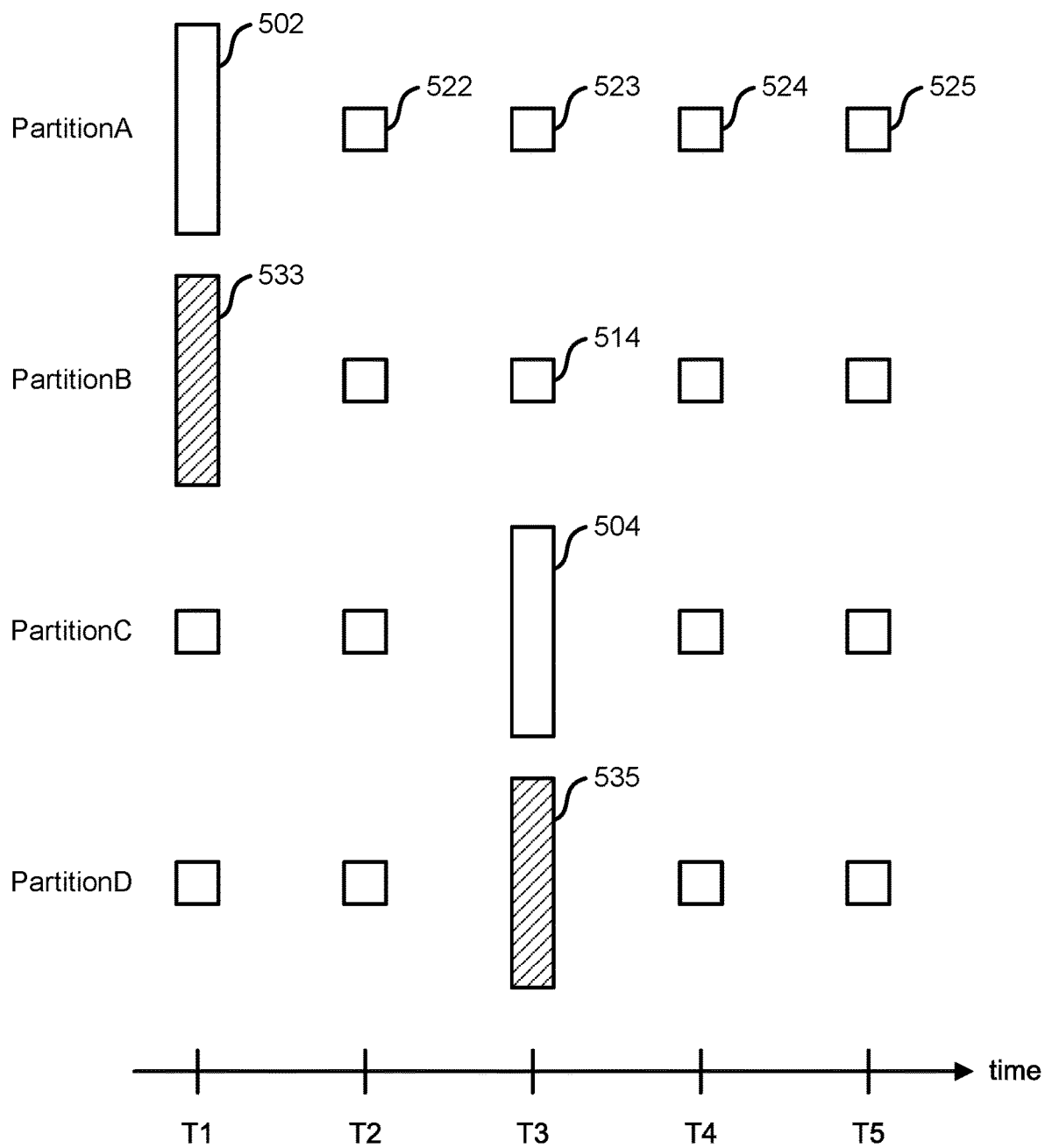
FIG. 5B depicts one embodiment of four snapshot chains corresponding with a set of electronic files that have been partitioned into four different data partitions.

FIG. 5B depicts one embodiment of four snapshot chains corresponding with a set of electronic files that have been partitioned into four different data partitions. The first snapshot chain of the four snapshot chains includes a first full image snapshot 502 and forward incremental snapshots 522-525. The second snapshot chain includes a second full image snapshot 533 and a forward incremental snapshot 514. The third snapshot chain of the four snapshot chains includes a third full image snapshot 504 and the fourth snapshot chain of the four snapshot chains includes a fourth full image snapshot 535. As depicted, the full image snapshots 502 and 533 correspond with a first point in time version of the set of electronic files at time T1 and the full image snapshots 504 and 535 corresponds with a third point in time version of the set of electronic files at time T3. Therefore, the full image snapshots 502 and 533 have been staggered from the full image snapshots 504 and 535. In one embodiment, the full image snapshots 502 and 504 may be acquired from a hardware server, such as server 160 in FIG. 1A, and the full image snapshots 533 and 535 may be generated using a storage appliance, such as storage appliance 170 in FIG. 1A. In another embodiment, the full image snapshots 502 and 504 may be acquired from a hardware server and the full image snapshots 533 and 535 may also be acquired from the hardware server.

Figure 5C:
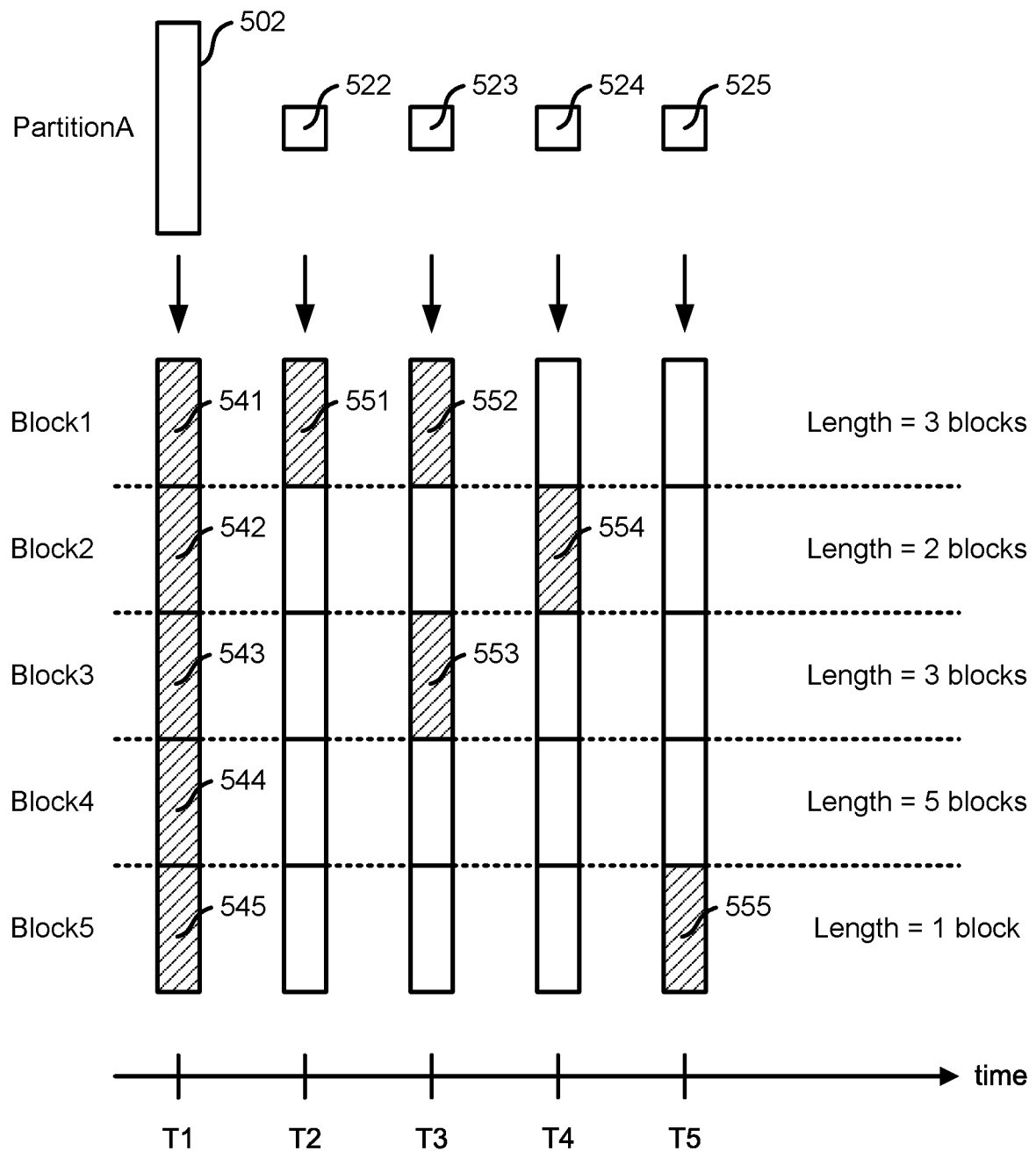
FIG. 5C depicts one embodiment of a snapshot chain depicted in FIGS. 5A-5B.

FIG. 5C depicts one embodiment of the first snapshot chain depicted in FIGS. 5A-5B that includes a first full image snapshot 502 and forward incremental snapshots 522-525. The data partition PartitionA has been partitioned into five data blocks comprising Block1 through Block5. Although five data blocks are depicted in FIG. 5C, other embodiments may comprise less than or more than five data blocks (e.g., a data partition may comprise 2000 32 MB data blocks). The incremental snapshots may be sharded at the same logical boundaries as the full image snapshot. As depicted, the first full image snapshot 502 comprises five data blocks 541-545 corresponding with the state of the data blocks Block1 through Block5 at time T1, the incremental snapshot 522 comprises data block 551 that corresponds with the state of the data block Block1 at time T2, the incremental snapshot 523 comprises the data blocks 552 and 553 that correspond with the states of the data blocks Block1 and Block3 at time T3, the incremental snapshot 524 comprises the data block 554 that corresponds with the state of the data block Block2 at time T4, and the incremental snapshot 525 comprises the data block 555 that corresponds with the state of the data block Block5 at time T5. In order to materialize or generate a full image snapshot of the set of electronic files at time T3, the data blocks 552-553, 542, and 544-545 must be read; in this case, the data blocks 541 and 543 within the first full image snapshot 502 must be replaced with the data blocks 552 and 553.

As depicted in FIG. 5C, the snapshot chain length at time T5 comprises four incrementals corresponding with the four incremental snapshots 522-525 that need to be applied to the full image snapshot 502 in order to generate the point in time version of the set of electronic files at time T5. The block chain length for Block1 at time T5 comprises three blocks as the number of snapshots that need to be read (e.g., starting from time T5 and working backwards in time or through prior point in time versions) in order to find the most recent data changes for Block1 is three corresponding with the three incremental snapshots 523-525. The block chain length for Block2 at time T5 comprises two blocks as the number of snapshots that need to be read in order to find the most recent data changes for Block2 is two corresponding with the two incremental snapshots 524-525. Similarly, the block chain length for Block4 at time T5 comprises five blocks as the number of snapshots that need to be read in order to find the most recent data changes for Block4 is five corresponding with the four incremental snapshots 522-525 and the full image snapshot 502. The aggregate block chain length for the five data blocks at time T5 may comprise 14 blocks comprising the sum of the block chain lengths for each of the five data blocks. The aggregate block chain length may correspond with the number of data block read operations that need to be performed in order to identify the data blocks for a particular point in time snapshot.

Figure 5D:
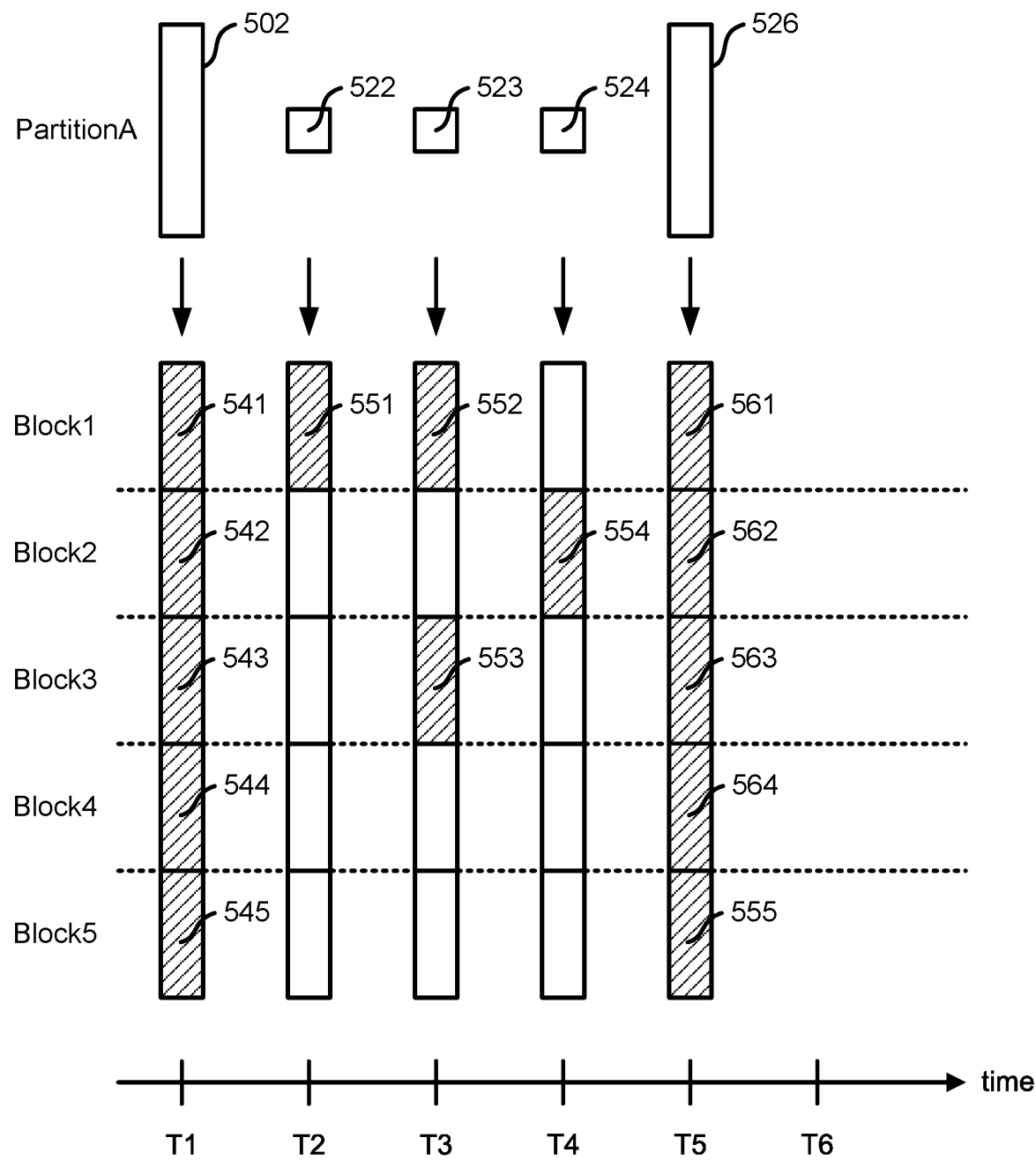
FIG. 5D depicts one embodiment of a snapshot chain in which a second full image snapshot has taken the place of an incremental snapshot.

FIG. 5D depicts one embodiment of a snapshot chain in which a second full image snapshot 526 has taken the place of the incremental snapshot 525 in FIG. 5C. The second full image snapshot 526 may comprise data blocks 561-564 and 555. The data block 561 may comprise a copy of the data block 552, the data block 562 may comprise a copy of the data block 554, the data block 563 may comprise a copy of the data block 553, and the data block 564 may comprise a copy of the data block 544. In one embodiment, the second full image snapshot 526 may be acquired or generated in response to detecting that the snapshot chain length for a point in time snapshot of the set of electronic files at time T6 will exceed a threshold snapshot chain length of five. In another embodiment, the second full image snapshot 526 may be acquired or generated in response to detecting that the aggregate block chain length at time T6 will exceed the maximum aggregate block chain length of 14. In some cases, a first subset of the data blocks comprising the second full image snapshot 526 may be acquired from a server while a second subset of the data blocks comprising the second full image snapshot 526 may be generated locally using a storage appliance. For example, data blocks 561-562 may be acquired from the server while data blocks 563-564 are generated using the storage appliance.

Figure 5E:
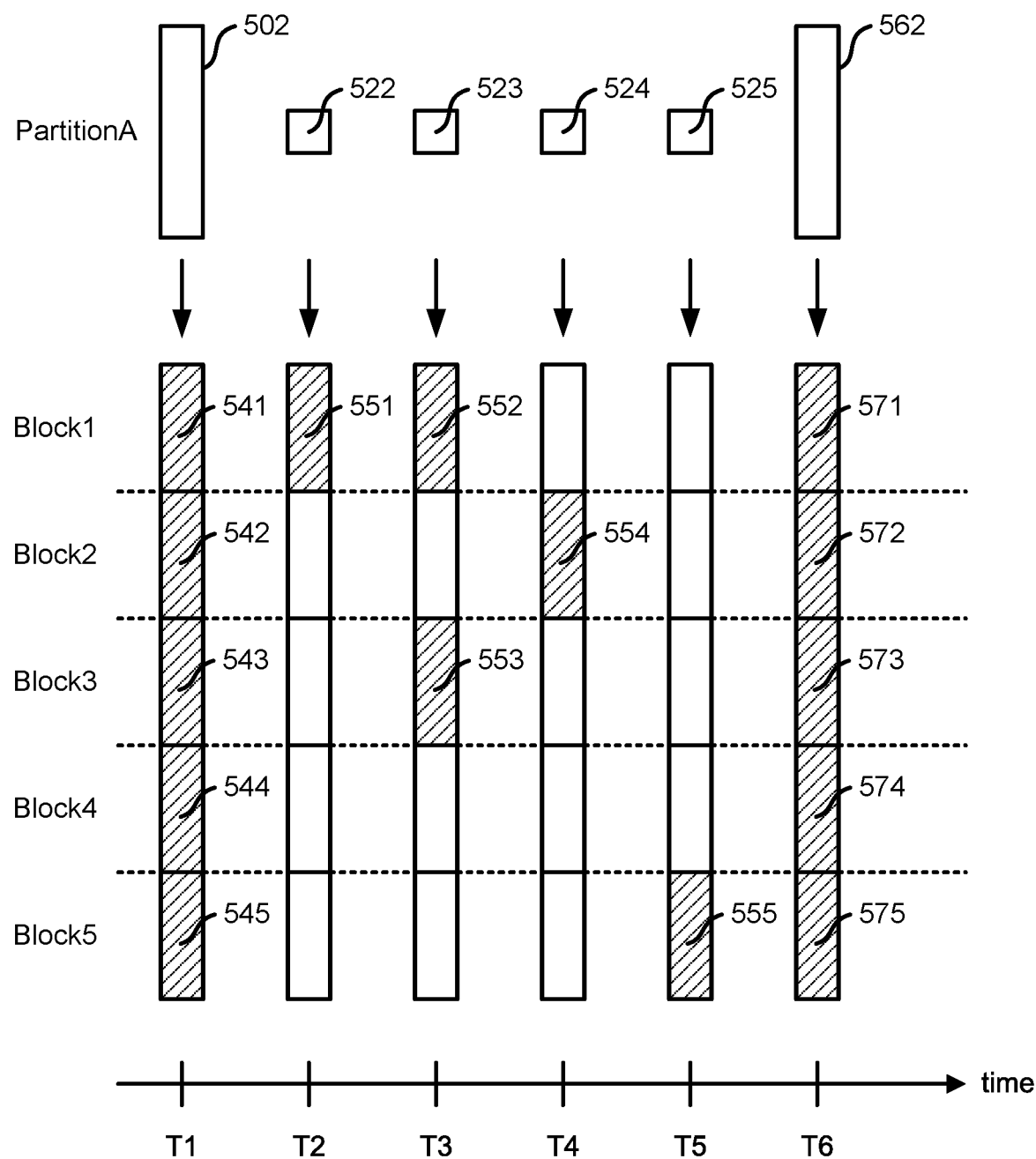
FIG. 5E depicts one embodiment of a snapshot chain in which a second full image snapshot has been stored corresponding with a point in time version of the set of electronic files at time T6.

FIG. 5E depicts one embodiment of a snapshot chain in which a second full image snapshot 562 has been stored corresponding with a point in time version of the set of electronic files at time T6. The second full image snapshot 562 may comprise the beginning of a new snapshot chain for the data partition PartitionA and subsequent incremental snapshots may include data changes relative to the second full image snapshot 562. In this case, the second full image snapshot 562 may comprise the anchor snapshot for the new snapshot chain.

Figure 5F:
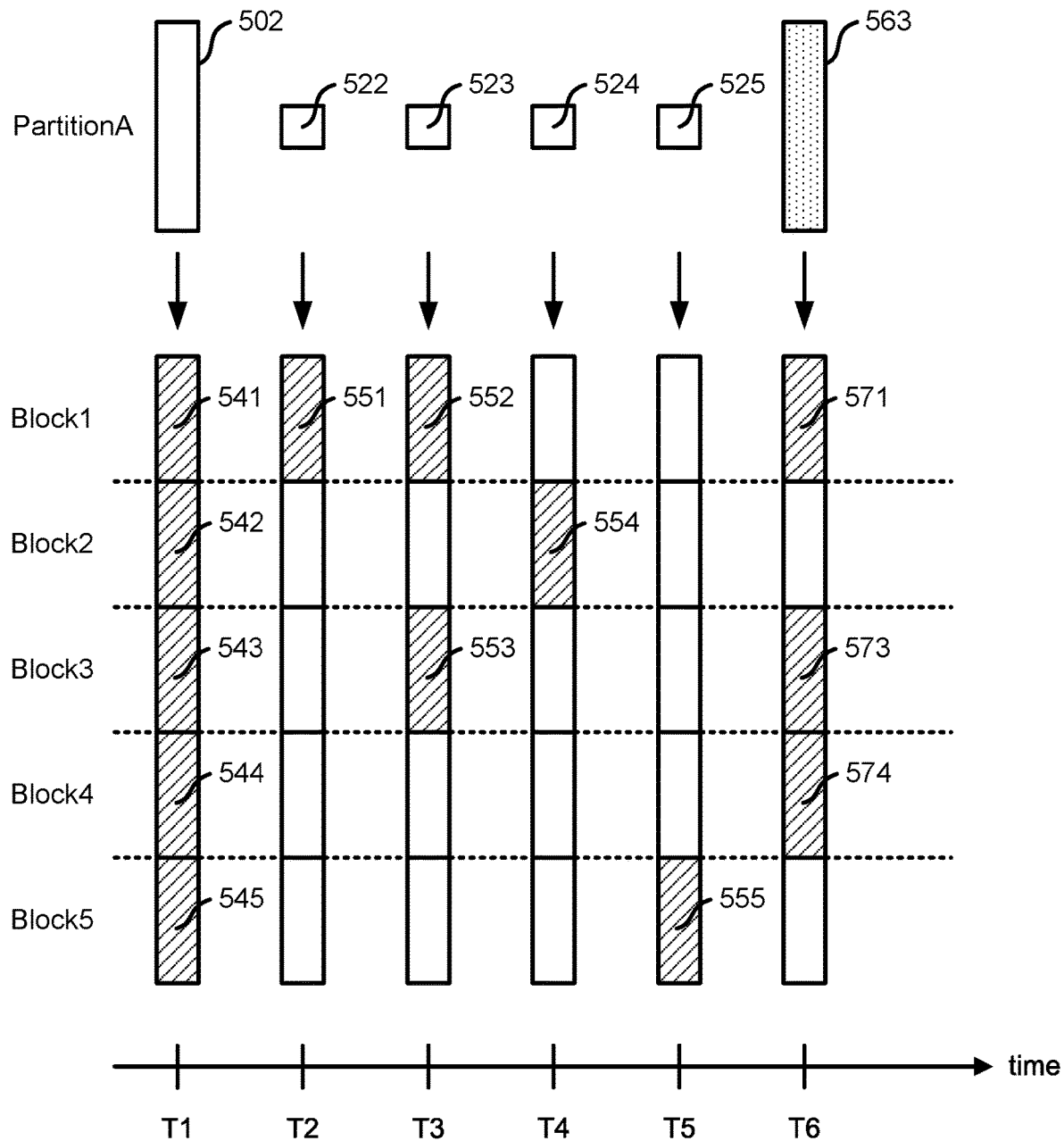
FIG. 5F depicts one embodiment of a snapshot chain with an incremental snapshot that includes redundant data blocks.

FIG. 5F depicts one embodiment of a snapshot chain with an incremental snapshot 563 that includes redundant data blocks. In some cases, rather than generating a second full image snapshot, such as the second full image snapshot 562 in FIG. 5E, an incremental snapshot with redundant data blocks may be used to reduce block chain lengths and/or the aggregate block chain length for a data partition. In one example, assuming that data changes only occurred to data within the data block Block1 at time T6, then data block 573 may be a copy of data block 553 and data block 574 may be a copy of data block 544. Although the snapshot chain length at time T6 has increased to five incrementals, the maximum block chain length at time T6 has been reduced from five blocks at time T5 in FIG. 5C to three blocks and the aggregate block chain length at time T6 has been reduced from 14 blocks at time T5 in FIG. 5C to eight blocks. Thus, the incremental snapshot 563 that includes redundant data blocks has reduced both the maximum block chain length and the aggregate block chain length without requiring a full image snapshot to be acquired.

Figure 5G:
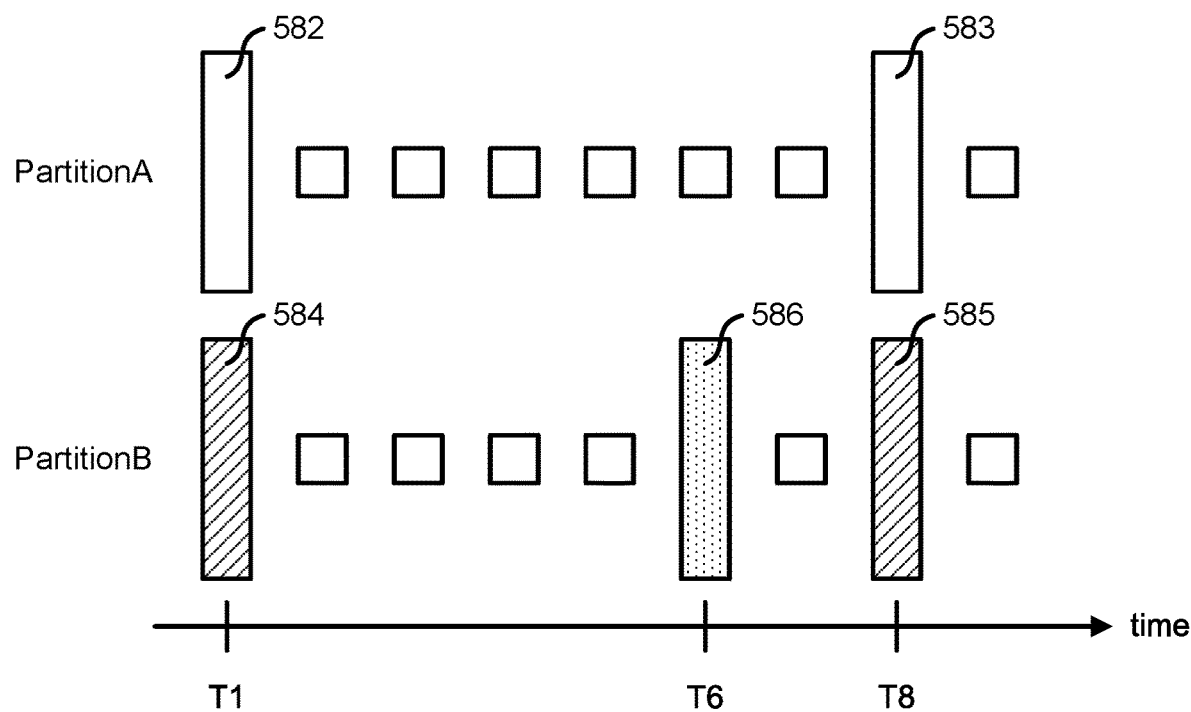
FIG. 5G depicts one embodiment of a snapshot chain that includes an incremental snapshot with redundant data blocks.

FIG. 5G depicts one embodiment of a snapshot chain that includes an incremental snapshot with redundant data blocks. As depicted, a first data partition PartitionA may include full image snapshots 582-583 and a second data partition PartitionB may include full image snapshots 584-585 and an incremental snapshot 586 that includes redundant data blocks. The incremental snapshot 586 may correspond with the incremental snapshot 563 in FIG. 5F. In one embodiment, the full image snapshots 582-583 may be acquired from a server while the full image snapshots 584-585 and the incremental snapshot 586 may be generated using a storage appliance. In another embodiment, the full image snapshots 584-585 may be acquired from a server and stored using a storage appliance while the incremental snapshot 586 may be generated locally using the storage appliance.

Figure 5H:
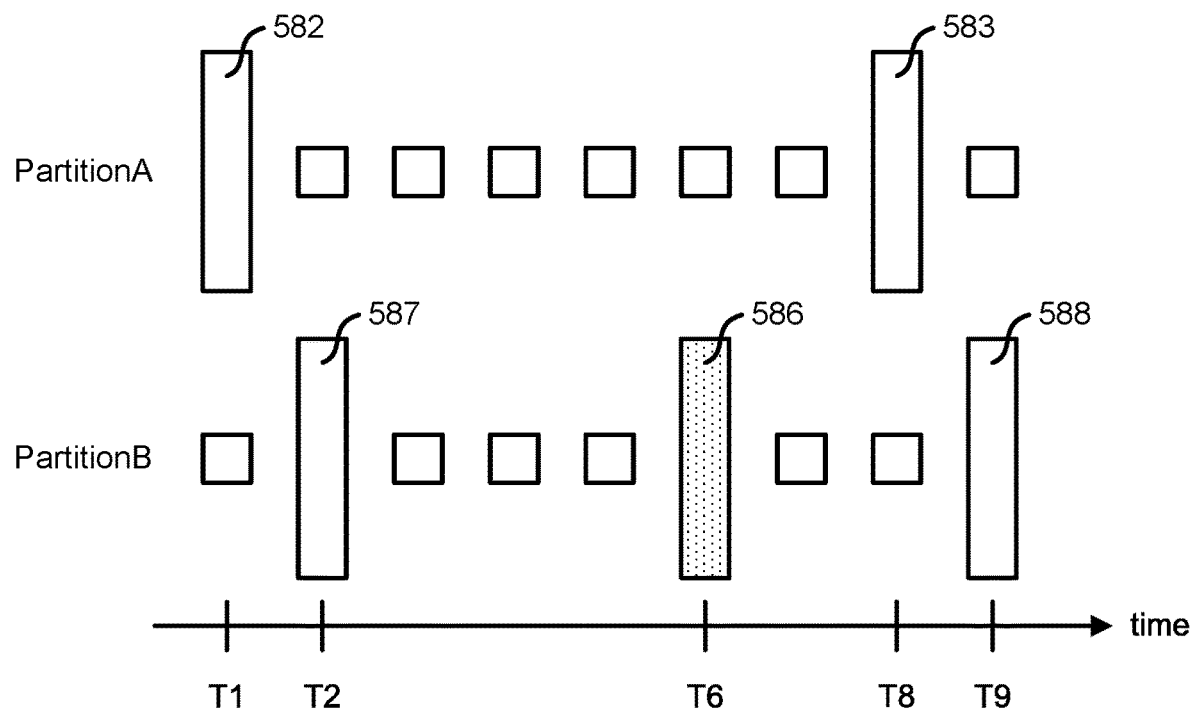
FIG. 5H depicts one embodiment of a snapshot chain that includes staggered full image snapshots and an incremental snapshot with redundant data blocks.

FIG. 5H depicts one embodiment of a snapshot chain that includes staggered full image snapshots and an incremental snapshot with redundant data blocks. As depicted, a first data partition PartitionA may include full image snapshots 582-583 and a second data partition PartitionB may include full image snapshots 587-588 and an incremental snapshot 586 that includes redundant data blocks. In one embodiment, the determination of whether to acquire and/or generate two full image snapshots for the data partitions at time T1 may depend on the number of full image snapshots that may be concurrently acquired from a server or number of full image snapshots that may be concurrently generated by a storage appliance. In another embodiment, the determination of whether to stagger the acquisition of full image snapshots 582 and 587 may depend on a maximum number of full image snapshots that may be acquired from a server for time T1.

Figure 5I:
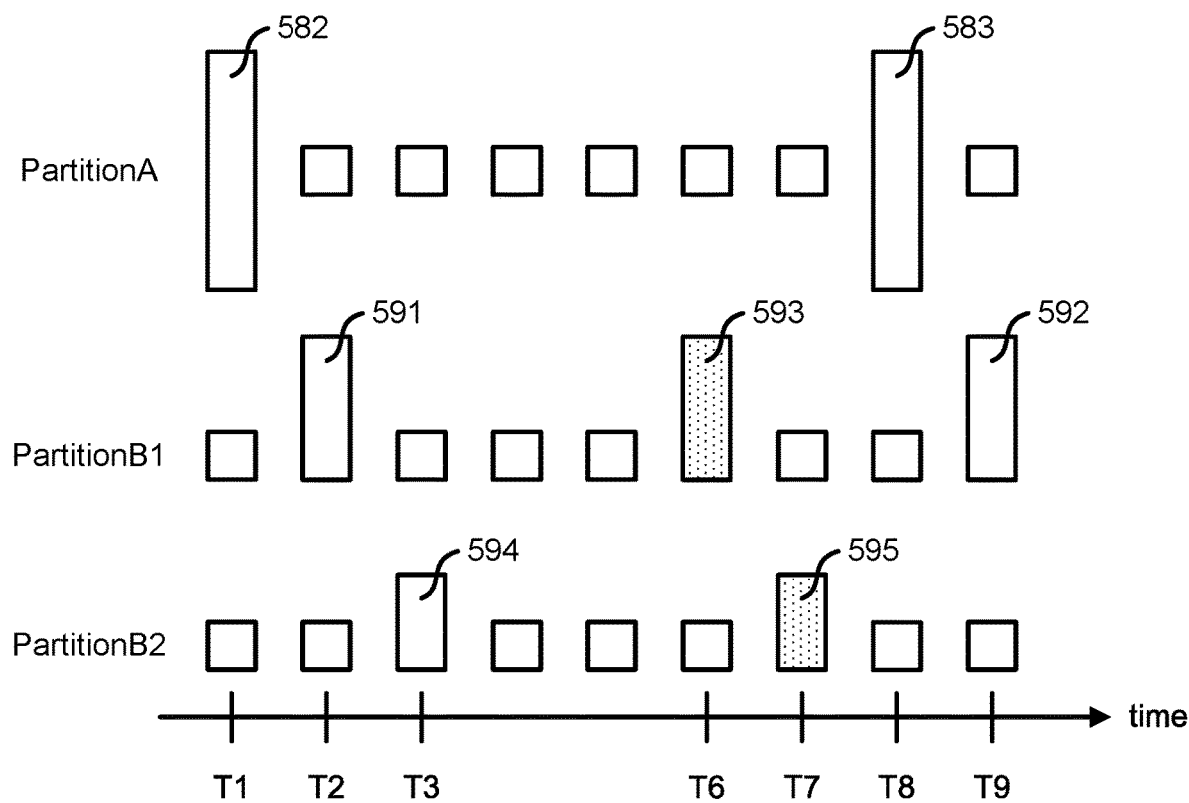
FIG. 5I depicts one embodiment in which a data partition has been partitioned into two sub-partitions.

FIG. 5I depicts one embodiment in which a data partition PartitionB has been partitioned into two sub-partitions PartitionB1 and PartitionB2. In this case, the acquisition and/or generation of full image snapshots 591 and 594 may be staggered and the acquisition and/or generation of incremental snapshots that include redundant blocks 593 and 595 may be staggered.

Figure 5J:
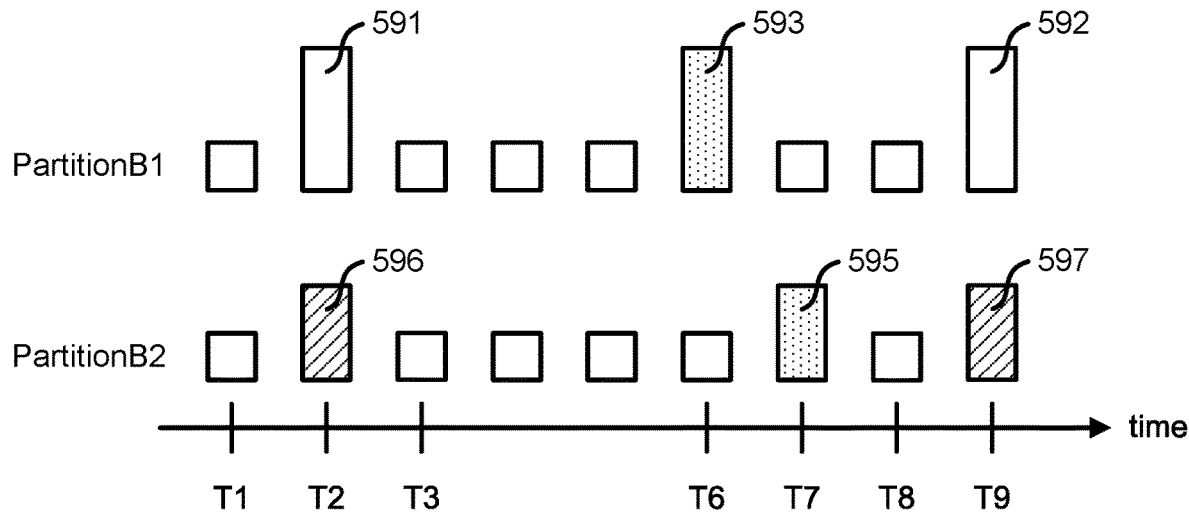
FIG. 5J depicts another embodiment in which a data partition has been partitioned into two sub-partitions.

FIG. 5J depicts another embodiment in which a data partition PartitionB has been partitioned into two sub-partitions PartitionB1 and PartitionB2. In this case, the full image snapshot 591 may be acquired from a server while the full image snapshot 596 may be generated locally using the storage appliance that stores the different point in time versions of the set of electronic files. Similarly, the full image snapshot 592 may be acquired from the server while the full image snapshot 597 may be generated locally using the storage appliance. The acquisition and/or generation of incremental snapshots that include redundant blocks 593 and 595 may be staggered. In one example, both of the incremental snapshots that include redundant blocks 593 and 595 may be generated using the storage appliance.

Figure 6A:
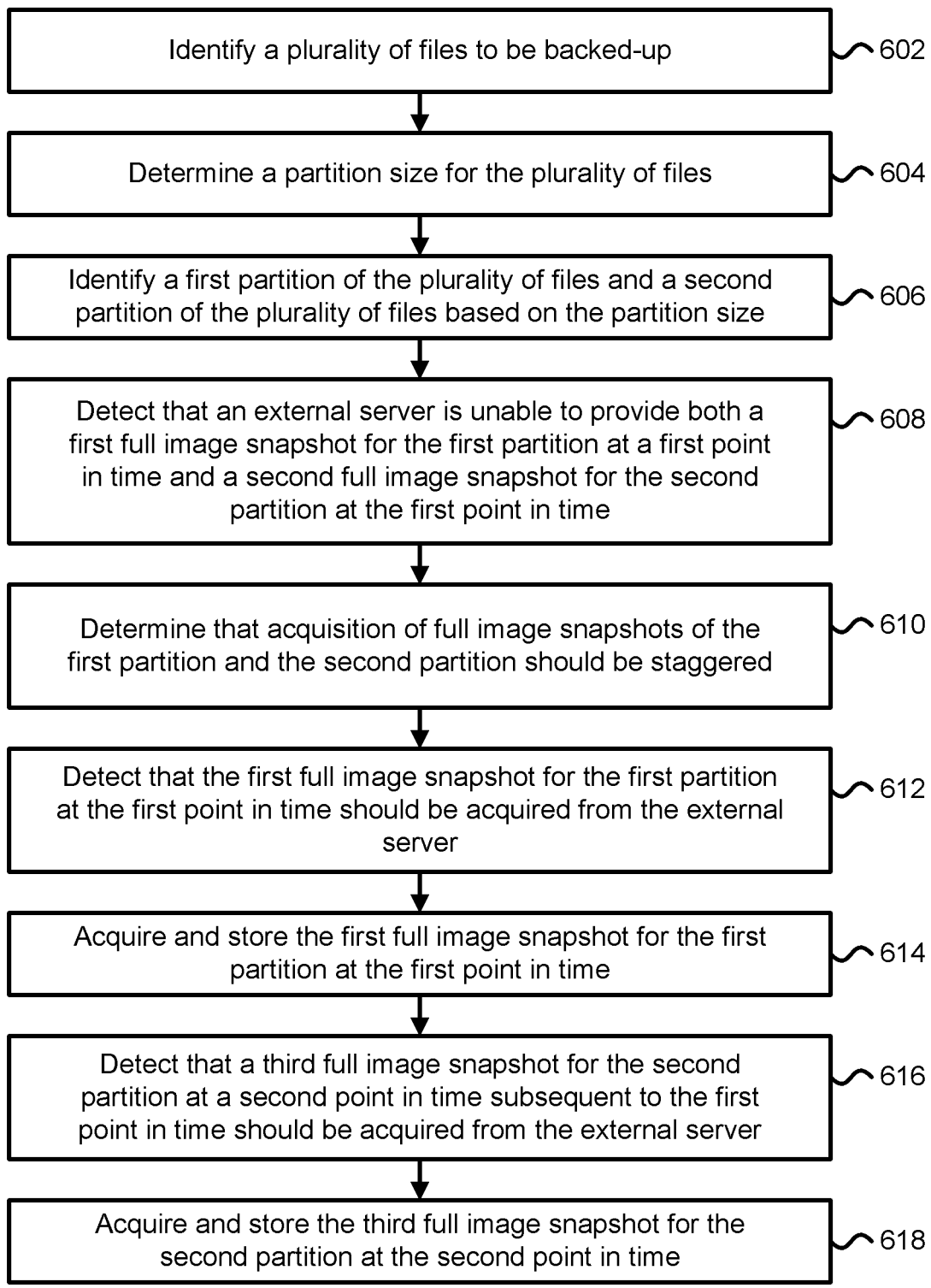
FIG. 6A is a flowchart describing one embodiment of a process for acquiring full image snapshots.

FIG. 6A is a flowchart describing one embodiment of a process for acquiring full image snapshots. In one embodiment, the process of FIG. 6A may be performed by a storage appliance, such as storage appliance 170 or storage appliance 140 in FIG. 1A. The process of FIG. 6A may be performed by a data storage node, such as data storage node 141 in FIG. 1D.

In step 602, a plurality of files to be backed-up is identified. The plurality of files may correspond with a virtual machine or a set of electronic files. In step 604, a partition size for the plurality of files is determined. The partition size may depend upon the number of data storage nodes in a cluster or the amount of available disk space within the cluster. In step 606, a first partition of the plurality of files and a second partition of the plurality of files are identified based on the partition size. In one example, the plurality of files may comprise 20 TBs of data, the first partition may comprise 10 TBs of data, and the second partition may comprise 10 TBs of data. In another example, the plurality of files may comprise 20K files, the first partition may comprise 10K files, and the second partition may comprise 10K files. In step 608, it is detected that an external server is unable to provide both a first full image snapshot for the first partition at a first point in time and a second full image snapshot for the second partition at the first point in time. In some cases, due to network bandwidth and/or compute resource constraints on the external server at the first point in time, the external server may only be able to provide a single 10 TB full image snapshot.

In step 610, it is determined that acquisition of full image snapshots of the first partition and the second partition should be staggered. In one embodiment, it may be determined that the two full image snapshots should be staggered in response to detection that the external server is unable to provide both full image snapshots. In another embodiment, it may be determined that the acquisition of full image snapshots of the first partition and the second partition should be staggered if a snapshot chain associated with either the first partition or the second partition has reached a triggering snapshot chain length that is less than a maximum snapshot chain length.

In step 612, it is detected that the first full image snapshot for the first partition at the first point in time should be acquired from the external server. In step 614, the first full image snapshot for the first partition at the first point in time is acquired and stored. In step 616, it is detected that a third full image snapshot for the second partition at a second point in time subsequent to the first point in time should be acquired from the external server. In step 618, the third full image snapshot for the second partition at the second point in time is acquired and stored. In one embodiment, the first full image snapshot for the first partition at the first point in time may correspond with full image snapshot 582 in FIG. 5H and the third full image snapshot for the second partition at the second point in time may correspond with full image snapshot 587 in FIG. 5H.

Figure 6B:
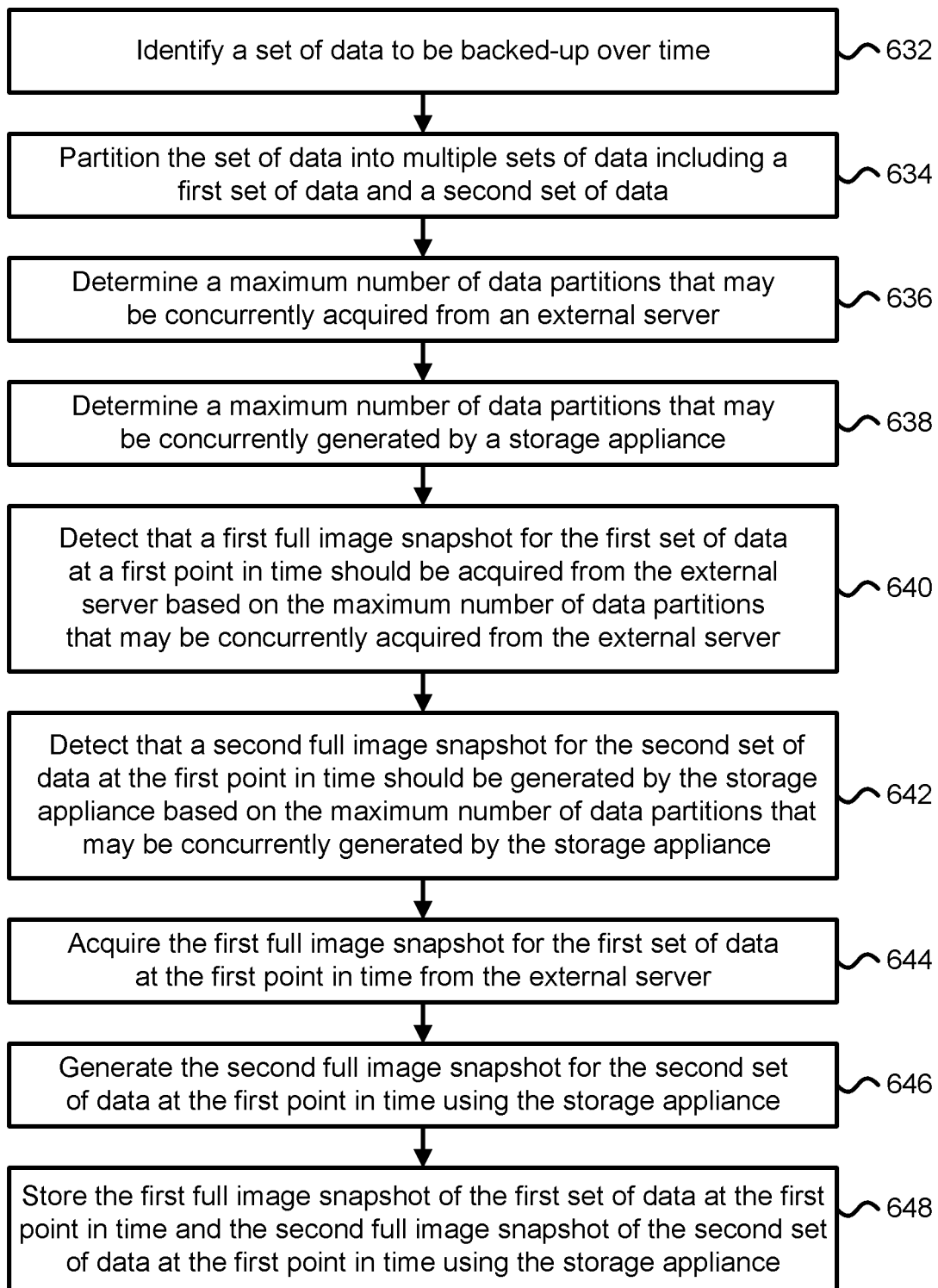
FIG. 6B is a flowchart describing an alternative embodiment of a process for acquiring full image snapshots.

FIG. 6B is a flowchart describing an alternative embodiment of a process for acquiring full image snapshots. In one embodiment, the process of FIG. 6B may be performed by a storage appliance, such as storage appliance 170 or storage appliance 140 in FIG. 1A. The process of FIG. 6B may be performed by a data storage node, such as data storage node 141 in FIG. 1D.

In step 632, a set of data to be backed-up over time is identified. The set of data may comprise a virtual machine, one or more virtual disks, or a set of electronic files. In step 634, the set of data is partitioned into multiple sets of data including a first set of data and a second set of data. In one example, the set of data may correspond with a set of 10K electronic files, the first set of data may correspond with a set of 6K electronic files, and the second set of data may correspond with a set of 4K electronic files. In step 636, a maximum number of data partitions that may be concurrently acquired from an external server is determined. The maximum number of data partitions may correspond with the maximum number of full image snapshots that may be acquired from the external server for a particular point in time snapshot of the set of data. In step 638, a maximum number of data partitions that may be concurrently generated by a storage appliance is determined. The maximum number of data partitions that may be concurrently generated by the storage appliance may correspond with the maximum number of full image snapshots that may be generated by the storage appliance for a particular point in time snapshot of the set of data.

In step 640, it is detected that a first full image snapshot for the first set of data at a first point in time should be acquired from the external server based on the maximum number of data partitions that may be concurrently acquired from the external server. In step 642, it is detected that a second full image snapshot for the second set of data at the first point in time should be generated by the storage appliance based on the maximum number of data partitions that may be concurrently generated by the storage appliance. In one embodiment, the first full image snapshot for the first set of data at the first point in time may correspond with full image snapshot 582 in FIG. 5G and the second full image snapshot for the second set of data at the first point in time may correspond with full image snapshot 584 in FIG. 5G.

In step 644, the first full image snapshot for the first set of data at the first point in time is acquired from the external server. In step 646, the second full image snapshot for the second set of data at the first point in time is generated using the storage appliance. In some cases, the second full image snapshot may be generated by the storage appliance while the first full image snapshot is acquired from the external server. In step 648, the first full image snapshot for the first set of data at the first point in time and the second full image snapshot for the second set of data at the first point in time are stored using the storage appliance.

Figure 7A:
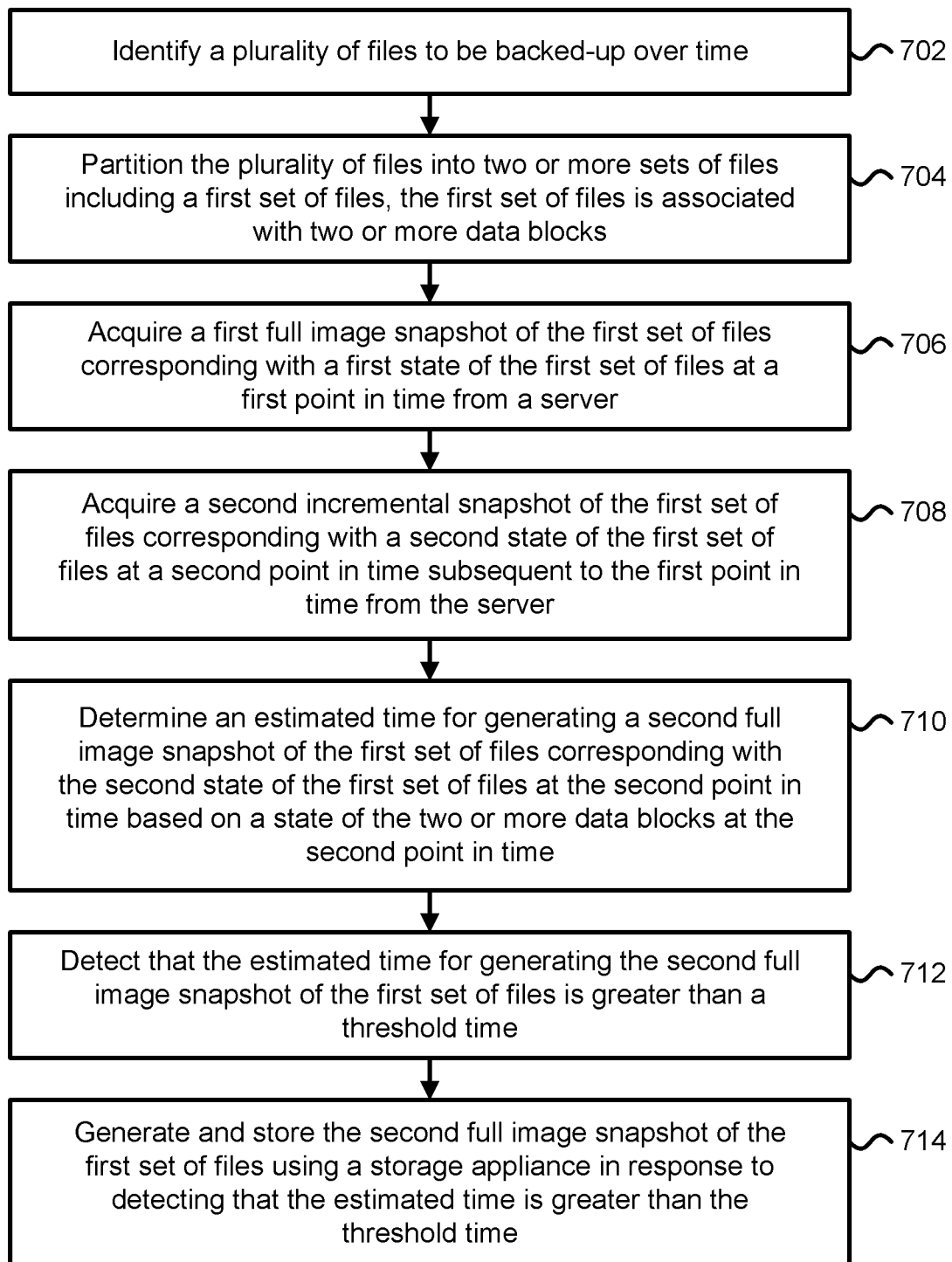
FIG. 7A is a flowchart describing one embodiment of a process for generating and storing full image snapshots.

FIG. 7A is a flowchart describing one embodiment of a process for generating full image snapshots. In one embodiment, the process of FIG. 7A may be performed by a storage appliance, such as storage appliance 170 or storage appliance 140 in FIG. 1A. The process of FIG. 7A may be performed by a data storage node, such as data storage node 141 in FIG. 1D.

In step 702, a plurality of files to be backed-up over time is identified. The plurality of files may correspond with a set of electronic files. In step 704, the plurality of files is partitioned into two or more sets of files including a first set of files. The first set of files may be associated with two or more data blocks. In one example, the first set of files may correspond with or comprise five data blocks, such as the five data blocks Block1 through Block5 in FIG. 5E. In step 706, a first full image snapshot of the first set of files corresponding with a first state of the first set of files at a first point in time is acquired from a server. In step 708, a second incremental snapshot of the first set of files corresponding with a second state of the first set of files at a second point in time subsequent to the first point in time is acquired from the server. In one embodiment, the first full image snapshot may correspond with full image snapshot 502 in FIG. 5E and the second incremental snapshot may correspond with incremental snapshot 525 in FIG. 5E.

In step 710, an estimated time for generating a second full image snapshot of the first set of files corresponding with the second state of the first set of files at the second point in time is determined based on a state of the two or more data blocks at the second point in time. In one embodiment, the estimated time for generating the second full image snapshot of the first set of files corresponding with the second state of the first set of files at the second point in time is determined based on an aggregate block chain length for the two or more data blocks of the first set of files at the second point in time. In step 712, it is detected that the estimated time for generating the second full image snapshot of the first set of files is greater than a threshold time (e.g., is greater than two minutes). In step 714, the second full image snapshot of the first set of files is generated and stored using a storage appliance in response to detecting that the estimated time is greater than the threshold time.

In one embodiment, upon detection that an aggregate block chain length for the two or more data blocks of the first set of files has exceeded a threshold number of blocks (e.g., is greater than 14 blocks), the storage appliance may generate and store the second full image snapshot of the first set of files. In another embodiment, upon detection that an aggregate block chain length for the two or more data blocks of the first set of files has exceeded a threshold number of blocks, the storage appliance may generate and store an incremental snapshot that includes redundant data blocks, such as the incremental snapshot 563 in FIG. 5F.

In one embodiment, upon detection that the maximum block chain length for the two or more data blocks at the second point in time has exceeded a threshold number of blocks (e.g., is greater than five blocks), the storage appliance may generate and store the second full image snapshot of the first set of files. In another embodiment, upon detection that the maximum block chain length for the two or more data blocks at the second point in time has exceeded a threshold number of blocks, the storage appliance may generate and store an incremental snapshot that includes redundant data blocks, such as the incremental snapshot 563 in FIG. 5F.

Figure 7B:
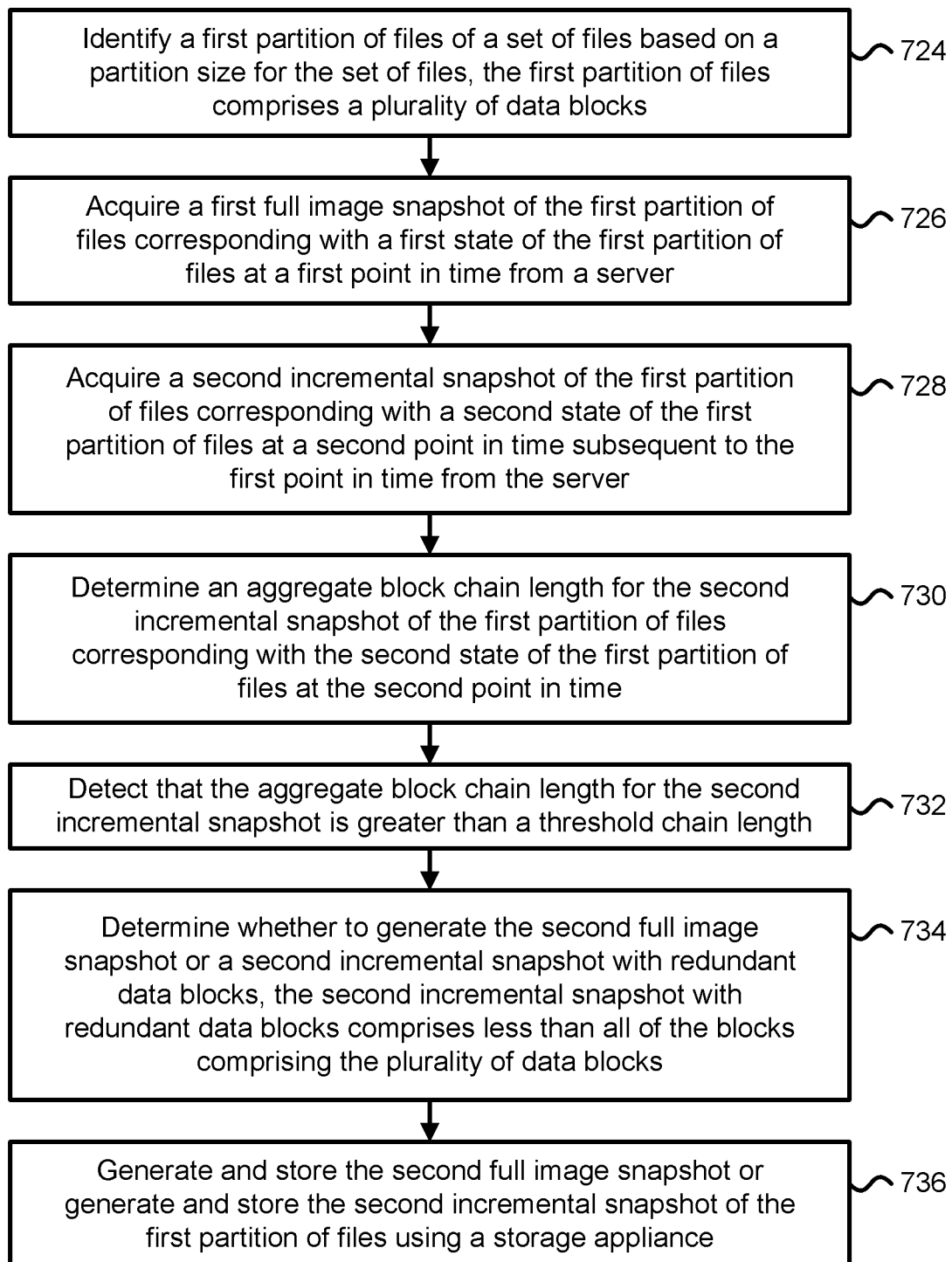
FIG. 7B is a flowchart describing another embodiment of a process for generating and storing full image snapshots.

FIG. 7B is a flowchart describing one embodiment of a process for generating and storing full image snapshots. In one embodiment, the process of FIG. 7B may be performed by a storage appliance, such as storage appliance 170 or storage appliance 140 in FIG. 1A. The process of FIG. 7B may be performed by a data storage node, such as data storage node 141 in FIG. 1D.

In step 724, a first partition of files of a set of files is identified based on a partition size for the set of files. The first partition of files may comprise a plurality of data blocks. In one example, the first partition of files may comprise five data blocks, such as the five data blocks Block1 through Block5 in FIG. 5C. In step 726, a first full image snapshot of the first partition of files corresponding with a first state of the first partition of files at a first point in time is acquired from a server. In step 728, a second incremental snapshot of the first partition of files corresponding with a second state of the first partition of files at a second point in time subsequent to the first point in time is acquired from the server. The server may correspond with server 160 in FIG. 1A. In one embodiment, the first full image snapshot may correspond with full image snapshot 502 in FIG. 5C and the second incremental snapshot may correspond with incremental snapshot 525 in FIG. 5C.

In step 730, an aggregate block chain length for the second incremental snapshot of the first partition of files corresponding with the second state of the first partition of files at the second point in time is determined. In one example, the aggregate block chain length may comprise the sum of the block chain lengths for each block of the plurality of blocks. In step 732, it is detected that the aggregate block chain length for the second incremental snapshot is greater than a threshold chain length (e.g., is greater than 14 blocks) or greater than a maximum aggregate block chain length for the first partition of files. In step 734, it is determined whether to generate the second full image snapshot or a second incremental snapshot with redundant data blocks. In one embodiment, the second incremental snapshot with redundant data blocks may be generated if the snapshot chain length is below a threshold length. The second incremental snapshot with redundant data blocks may comprise less than all of the blocks comprising the plurality of data blocks. The second incremental snapshot with redundant data blocks may comprise a subset of the plurality of data blocks that comprises the entirety of the first partition of files. In one embodiment, the second full image snapshot may correspond with full image snapshot 562 in FIG. 5E and the second incremental snapshot with redundant data blocks may correspond with the incremental snapshot 563 with redundant data blocks in FIG. 5F. In step 736, one of the second full image snapshot of the first partition of files or the second incremental snapshot with redundant data blocks for the first partition of files is generated and stored using a storage appliance, such as storage appliance 170 in FIG. 1A.

Figure 7C:
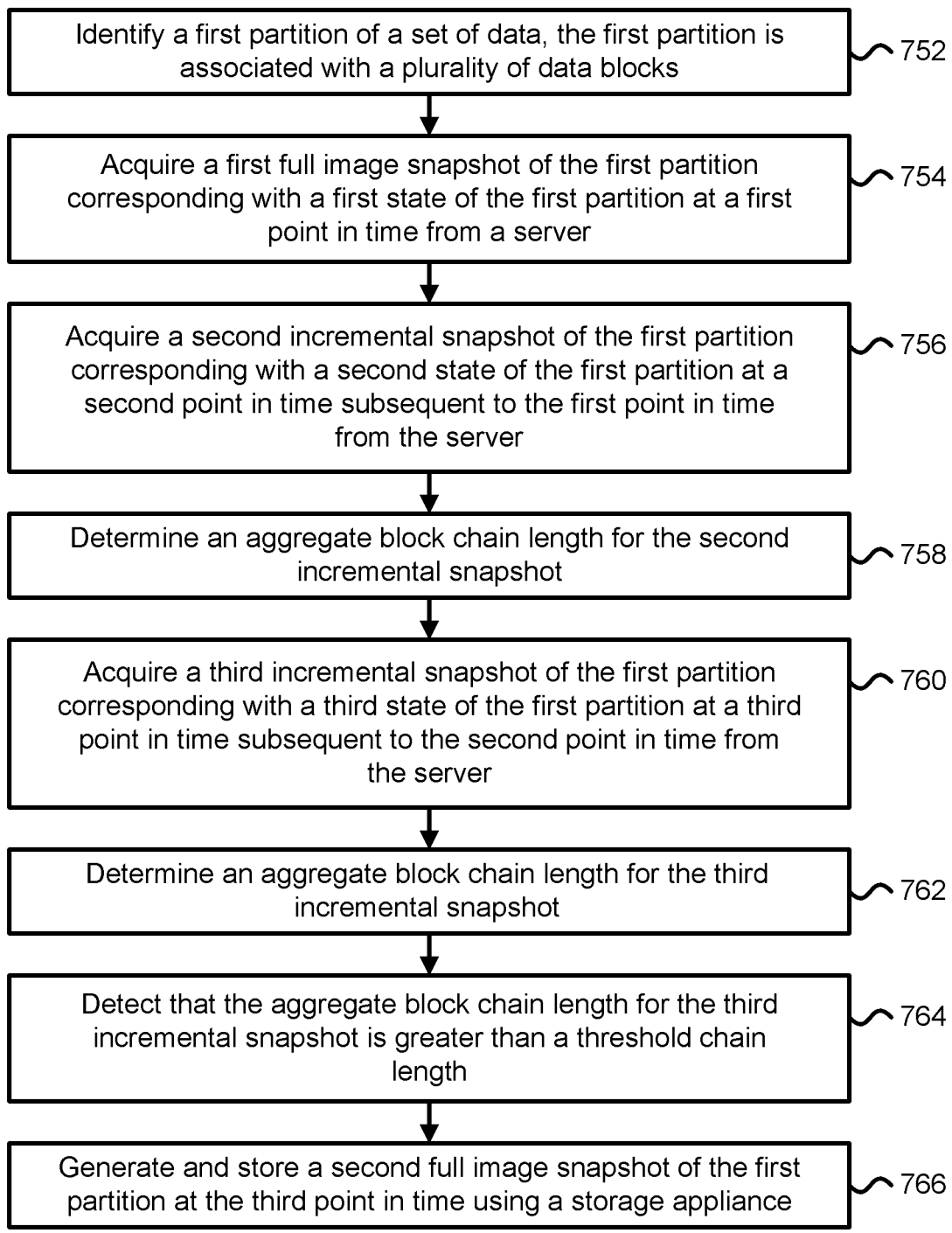
FIG. 7C is a flowchart describing one embodiment of a process for generating and storing full image snapshots based on an aggregate block chain length.

FIG. 7C is a flowchart describing one embodiment of a process for generating and storing full image snapshots based on an aggregate block chain length. In one embodiment, the process of FIG. 7C may be performed by a storage appliance, such as storage appliance 170 or storage appliance 140 in FIG. 1A. The process of FIG. 7C may be performed by a data storage node, such as data storage node 141 in FIG. 1D.

In step 752, a first partition of a set of data is identified. The first partition may be associated with a plurality of data blocks. In one embodiment, the first partition may correspond with data partition PartitionA in FIG. 5F and the plurality of data blocks may correspond with blocks Block1 through Block5 in FIG. 5F. In step 754, a first full image snapshot of the first partition corresponding with a first state of the first partition at a first point in time is acquired from a server. In step 756, a second incremental snapshot of the first partition corresponding with a second state of the first partition at a second point in time subsequent to the first point in time is acquired from the server. In step 758, an aggregate block chain length for the second incremental snapshot is determined. In some cases, it may be detected that the aggregate block chain length for the second incremental snapshot is not greater than a threshold chain length. In step 760, a third incremental snapshot of the first partition corresponding with a third state of the first partition at a third point in time subsequent to the second point in time is acquired from the server. In step 762, an aggregate block chain length for the third incremental snapshot is determined. In step 764, it is detected that the aggregate block chain length for the third incremental snapshot is greater than a threshold chain length (or is greater than the maximum aggregate block chain length for incremental snapshots). The aggregate block chain length for the third incremental snapshot may be greater than the aggregate block chain length for the second incremental snapshot. In step 766, a second full image snapshot of the first partition at the third point in time is generated and stored using a storage appliance.

One embodiment of the disclosed technology includes identifying a set of data to be backed-up over time and partitioning the set of data into two or more sets of data including a first set of data and a second set of data. The first set of data is associated with a first snapshot chain and the second set of data is associated with a second snapshot chain. The method further comprises detecting that the first snapshot chain has reached a triggering snapshot chain length less than a maximum snapshot chain length for the first snapshot chain, determining that acquisition of full image snapshots for the first set of data and the second set of data should be staggered in response to detecting that the first snapshot chain has reached the triggering snapshot chain length, and staggering the acquisition of full image snapshots for the first set of data and the second set of data such that a first full image snapshot for a first point in time version of the first set of data is acquired from a server prior to acquisition of a second full image snapshot for a second point in time version of the second set of data from the server and both the first snapshot chain and the second snapshot chain comprise snapshot chain lengths less than the maximum snapshot chain length. The method further comprises storing the first full image snapshot for the first point in time version of the first set of data and the second full image snapshot for the second point in time version of the second set of data using a storage appliance.

One embodiment of the disclosed technology includes identifying a first data partition associated with a first snapshot chain. The first data partition comprises a plurality of data blocks. The method further comprises acquiring a first full image snapshot of the first data partition corresponding with a first state of the first data partition at a first point in time from a server, acquiring a second incremental snapshot of the first data partition corresponding with a second state of the first data partition at a second point in time subsequent to the first point in time from the server, determining an aggregate block chain length for the second incremental snapshot corresponding with the second state of the first data partition at the second point in time, detecting that the aggregate block chain length for the second incremental snapshot is greater than a threshold chain length, generating one or more data blocks corresponding with the second state of the first data partition at the second point in time different from data blocks of the second incremental snapshot in response to detecting that the aggregate block chain length for the second incremental snapshot is greater than the threshold chain length, and storing the one or more data blocks and the data blocks of the second incremental snapshot.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a function programming language such as Scala, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
   identifying a first data partition associated with a first snapshot chain, the first data partition comprises a plurality of data blocks;
   acquiring a first full image snapshot of the first data partition corresponding with a first state of the first data partition at a first point in time from a server corresponding with a first version of a set of files;
   acquiring a second incremental snapshot of the first data partition corresponding with a second state of the first data partition at a second point in time subsequent to the first point in time from the server corresponding with the first version of the set of files;
   determining an aggregate block chain length for the second incremental snapshot corresponding with the second state of the first data partition at the second point in time;
   detecting that the aggregate block chain length for the second incremental snapshot is greater than a threshold chain length corresponding to a maximum block chain length for the plurality of data blocks;
   acquiring or generating a second full image snapshot corresponding with the second state of the first data partition at the second point in time by generating one or more data blocks different from data blocks of the second incremental snapshot in response to detecting that the aggregate block chain length for the second incremental snapshot is greater than the threshold chain length, the threshold chain length decreasing when an amount of available disk space within a cluster of data storage nodes increases; and
   storing the one or more data blocks and the data blocks of the second incremental snapshot.

2. The method of claim 1, wherein:
   the generating and storing of the one or more data blocks corresponding with the second state of the first data partition at the second point in time reduces the aggregate block chain length for the snapshot corresponding with the second state of the first data partition at the second point in time.

3. The method of claim 1, wherein:
   the determining the aggregate block chain length for the second incremental snapshot includes computing block chain lengths for each block of the plurality of data blocks and summing the block chain lengths for each block of the plurality of data blocks.

4. The method of claim 3, wherein:
   the computing block chain lengths for each block of the plurality of data blocks includes computing a first block chain length for a first block of the plurality of data blocks, the first block chain length corresponds with a number of incremental snapshots from a prior snapshot of the plurality of data blocks that includes the most recent data changes to the first block to the most recent snapshot of the plurality of data blocks.

5. The method of claim 4, wherein:
   the most recent snapshot of the plurality of data blocks corresponds with the second state of the first data partition.

6. The method of claim 3, wherein:
   the computing block chain lengths for each block of the plurality of data blocks includes computing a first block chain length for a first block of the plurality of data blocks, the first block chain length corresponds with a number of incremental snapshots from a prior state of the first data, partition comprising the most recent data changes to the first block to the second state of the first data partition.

7. The method of claim 1, wherein:
   the one or more data blocks and the data blocks of the second incremental snapshot comprise a second full image snapshot of the first data partition corresponding with the second state of the first data partition at the second point in time.

8. The method of claim 1, wherein:
   the one or more data blocks and the data blocks of the second incremental snapshot comprise less than all of the data blocks for a second full image snapshot of the first data partition corresponding with the second state of the first data partition at the second point in time.

9. The method of claim 8, wherein:
   the one or more data blocks and the data blocks of the second incremental snapshot comprise an incremental snapshot with redundant data blocks.

10. The method of claim 1, further comprising:
    identifying a set of electronic files to be backed-up over time using a cluster of data storage nodes;
    partitioning the set of electronic files into a plurality of data partitions, the plurality of data partitions includes the first data partition; and
    setting the threshold chain length based on an amount of available disk space within the cluster of data storage nodes.

11. The method of claim 1, wherein:
    the generating the one or more data blocks corresponding with the second state of the first data partition at the second point in time is performed by a storage appliance; and
    the storing the one or more data blocks and the data blocks of the second incremental snapshot is performed by the storage appliance.

12. A data management system, comprising:
    a memory; and
    one or more processors in communication with the memory configured to identify a first data partition associated with a first snapshot chain, the first data partition comprises a plurality of data blocks, the one or more processors configured to acquire a first full image snapshot of the first data partition corresponding with a first state of the first data partition at a first point in time from a server corresponding with a first version of a set of files and acquire a second incremental snapshot of the first data partition corresponding with a second state of the first data partition at a second point in time subsequent to the first point in time from the server corresponding with the first version of the set of files, the one or more processors configured to determine an aggregate block chain length for the second incremental snapshot corresponding with the second state of the first data partition at the second point in time and detect that the aggregate block chain length for the second incremental snapshot is greater than a threshold chain length corresponding to a maximum block chain length for the plurality of data blocks, the one or more processors configured to acquire or generate a second full image snapshot corresponding with the second state of the first data partition at the second point in time by generating one or more data blocks different from data blocks of the second incremental snapshot in response to detection that the aggregate block chain length for the second incremental snapshot is greater than the threshold chain length, the threshold chain length decreasing when an amount of available disk space within a cluster of data storage nodes increases, the one or more processors configured to cause the one or more data blocks and the data blocks of the second incremental snapshot to be stored in the memory.

13. The data management system of claim 12, wherein:
the storage of the one or more data blocks corresponding with the second state of the first data partition at the second point in time reduces the aggregate block chain length for the snapshot corresponding with the second state of the first data partition.

14. The data management system of claim 12, wherein:
the one or more processors configured to determine the aggregate block chain length for the second incremental snapshot via computation of block chain lengths for each block of the plurality of data blocks and summation of the block chain lengths for each block of the plurality of data blocks.

15. The data management system of claim 12, wherein:
the one or more processors configured to compute a first block chain length for a first block of the plurality of data blocks, the first block chain length corresponds with a number of incremental snapshots from a prior snapshot of the plurality of data blocks that includes the most recent data changes to the first block to the most recent snapshot of the plurality of data blocks.

16. The data management system of claim 15, wherein:
the most recent snapshot of the plurality of data blocks corresponds with the second state of the first data partition; and
the one or more processors configured to set the threshold chain length based on an amount of available disk space within a cluster of data storage nodes.

17. The data management system of claim 12, wherein:
the one or more processors configured to compute a first block chain length for a first block of the plurality of data blocks, the first block chain length corresponds with a number of incremental snapshots from a prior state of the first data partition that includes the most recent data changes to the first block to the second state of the first data partition.

18. The data management system of claim 12, wherein:
the one or more data blocks and the data blocks of the second incremental snapshot comprise a second full image snapshot of the first data partition corresponding with the second state of the first data partition at the second point in time.

19. The data management system of claim 12, wherein:
the one or more data blocks and the data blocks of the second incremental snapshot comprise less than all of the data blocks for a second full image snapshot of the first data partition corresponding with the second state of the first data partition at the second point in time.

20. One or more storage devices containing processor readable code for programming one or more processors to perform a method for operating a data management system, the processor readable code comprising:
processor readable code configured to identify a first data partition associated with a first snapshot chain, the first data partition comprises a plurality of data blocks;
processor readable code configured to acquire a first full image snapshot of the first data partition corresponding with a first state of the first data partition at a first point in time from a server corresponding with a first version of a set of files;
processor readable code configured to acquire a second incremental snapshot of the first data partition corresponding with a second state of the first data partition at a second point in time subsequent to the first point in time from the server corresponding with the first version of the set of files;
processor readable code configured to determine an aggregate block chain length for the second incremental snapshot corresponding with the second state of the first data partition at the second point in time via determination of block chain lengths for each block of the plurality of data blocks and summation of the block chain lengths for each block of the plurality of data blocks;
processor readable code configured to detect that the aggregate block chain length for the second incremental snapshot is greater than a threshold chain length corresponding to a maximum block chain length for the plurality of data blocks;
processor readable code configured to acquire or generate a second full image snapshot corresponding with the second state of the first data partition at the second point in time by generating one or more data blocks different from data blocks of the second incremental snapshot in response to detection that the aggregate block chain length for the second incremental snapshot is greater than the threshold chain length, the threshold chain length decreasing when an amount of available disk space within a cluster of data storage nodes increases; and
processor readable code configured to store the one or more data blocks and the data blocks of the second incremental snapshot.

* * * * *

UNITED STATES PATENT AND TRADEMARK OFFICE
CERTIFICATE OF CORRECTION

| | | |
|---|---|---|
| PATENT NO. | : 11,137,928 B2 | Page 1 of 1 |
| APPLICATION NO. | : 16/261111 | |
| DATED | : October 5, 2021 | |
| INVENTOR(S) | : Lee et al. | |

It is certified that error appears in the above-identified patent and that said Letters Patent is hereby corrected as shown below:

In the Specification

In Column 1, Line 31, delete "snapshots)," and insert --snapshots,-- therefor

In Column 19, Line 2, delete "path/snapshots/VM_A/s6/s6.delta)," and insert --path /snapshots/VM_A/s6/s6.delta),-- therefor In the Claims In Column 42, Line 1, in Claim 6, delete "first data," and insert --first data-- therefor Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*